US006600569B1

(12) United States Patent
Osada et al.

(10) Patent No.: US 6,600,569 B1
(45) Date of Patent: Jul. 29, 2003

(54) PRINTING CONTROL APPARATUS, PRINTING CONTROL METHOD, PRINTING CONTROL SYSTEM, AND STORAGE MEDIUM IN WHICH PRINTING CONTROL PROGRAM IS STORED

(75) Inventors: Mamoru Osada, Kawasaki (JP); Naoko Shimotai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/178,883

(22) Filed: Oct. 27, 1998

(30) Foreign Application Priority Data

Oct. 27, 1997 (JP) .............................. 9-294665
Aug. 27, 1998 (JP) ............................ 10-241751

(51) Int. Cl.$^7$ .............................. G06F 15/00; G06K 1/00
(52) U.S. Cl. ...................... 358/1.12; 358/1.15; 358/1.1; 358/1.13; 358/1.14; 358/296
(58) Field of Search ............................. 358/1.12, 1.15, 358/1.1, 1.13, 1.14, 296

(56) References Cited

U.S. PATENT DOCUMENTS

| | | | | | |
|---|---|---|---|---|---|
| 5,327,526 A | * | 7/1994 | Nomura et al. | ............ | 358/1.15 |
| 5,428,747 A | | 6/1995 | Kitamoto | ................ | 395/275 |
| 5,625,757 A | * | 4/1997 | Kageyama et al. | ........ | 358/1.14 |
| 5,832,301 A | * | 11/1998 | Yamaguchi | .................. | 710/48 |
| 5,873,659 A | * | 2/1999 | Edwards et al. | ........... | 358/1.15 |
| 5,923,013 A | * | 7/1999 | Suzuki et al. | ................ | 235/375 |
| 5,982,994 A | * | 11/1999 | Mori et al. | ................ | 358/1.15 |
| 5,999,707 A | * | 12/1999 | Taniguchi et al. | ......... | 358/1.15 |
| 6,038,621 A | * | 3/2000 | Gale et al. | .................... | 710/56 |
| 6,089,765 A | * | 7/2000 | Mori | ........................... | 400/61 |
| 6,195,171 B1 | * | 2/2001 | Ochiai | ....................... | 358/1.15 |
| 6,327,044 B1 | * | 12/2001 | Shima | ....................... | 358/1.13 |

FOREIGN PATENT DOCUMENTS

| EP | 0 653 700 | 5/1995 | |
|---|---|---|---|
| EP | 0859497 A2 | * 8/1998 | ........... H04L/29/08 |

* cited by examiner

*Primary Examiner*—Edward Coles
*Assistant Examiner*—Ashanti Ghee
(74) *Attorney, Agent, or Firm*—Fitzpatrick, Cella, Harper & Scinto

(57) ABSTRACT

A printing control apparatus for analyzing and processing an input print job that includes printing management data for managing the print job and print data. Header information identifying the printing management data has been added to the printing management data and header information identifying the print data and indicating a data size of the print data has been added to the print data. Header information of input data is analyzed and input data determined to be printing management data in accordance with the header information is stored in a management information storage medium and input data determined to be print data in accordance with the head information is stored in a print data storage medium on the basis of the data size indicated in the header information, without analyzing the print data.

27 Claims, 23 Drawing Sheets

FIG. 4

| JOB NUMBER | QUEUE NUMBER | USER NAME | FILE NAME | PARAMETER LIST HANDLE | STATE INFORMATION |
|---|---|---|---|---|---|
| 1 | 1 | SUZUKI | ugauga | 0x00abcdef | PROCESSING |
| 2 | 3 | YAMADA | hogehoge | 0x00123456 | QUEUED TO PRINT |
| 3 | 0 | SAITO | mogera | 0x0013579b | RECEIVING |
| 0 | 0 | NULL | NULL | NULL | EMPTY |
| .. | .. | .. | .. | .. | .. |

| PRINTER STATE | SPOOLER JOB LIST | PRINTER JOB LIST | PORT |
|---|---|---|---|

DOCUMENT : lalala      PRIORITY : 1

OWNER : TORII          COLOR MODE : MONOCHROME

SIZE : 32KB            DOUBLE-SIDED : NULL

| DOCUMENT | STATE | OWNER | SIZE |
|---|---|---|---|
| ○ ugauga | PROCESSING | SASAKI | 32 |
| ○ hogehoge | QUEUED TO PRINT | SHINODA | 24 |
| ○ mogera | QUEUED TO PRINT | INOUE | 32 |
| ▲ lalala | QUEUED TO PRINT | TORII | 32 |
| ○ taptap | RECEIVING | TAKAJO | 24 |

Canon LASER SHOOT LB-450

OPTION   HELP

FIG. 22

| JOB NUMBER 401 | QUEUE NUMBER 402 | PRIORITY 2201 | USER NAME 403 | FILE NAME 404 | PARAMETER LIST HANDLE 405 | STATE INFORMATION 406 |
|---|---|---|---|---|---|---|
| 1 | 1 | 3 | SASAKI | ugauga | 0x00abcdef | PROCESSING |
| 2 | 4 | 3 | SHINODA | hogehoge | 0x00fdecba | QUEUED TO PRINT |
| 3 | 3 | 2 | INOUE | mogera | 0x00654321 | QUEUED TO PRINT |
| 4 | 2 | 1 | TORII | lalala | 0x00123456 | QUEUED TO PRINT |
| 5 | 0 | 3 | TAKAJO | taptap | 0x0013579b | RECEIVING |
| 0 | 0 | 0 | NULL | NULL | NULL | EMPTY |
| .. | .. | .. | .. | .. | .. | .. |

PRINTING CONTROL APPARATUS, PRINTING CONTROL METHOD, PRINTING CONTROL SYSTEM, AND STORAGE MEDIUM IN WHICH PRINTING CONTROL PROGRAM IS STORED

BACKGROUND OF THE INVENTION

1. Field of the Invention

The present invention relates to a printing control apparatus for controlling to print out a print job transmitted from a host computer and, more particularly, to a printing control apparatus for analyzing and printing print jobs, each having a data size as additional information, in units of commands, when data is exchanged between a client and a host, a printing control method, a storage medium in which a printing control program is stored, and a printing control system.

2. Description of the Prior Art

The prior art will be described with reference to FIGS. 5 and 6. FIG. 5 shows the arrangement of a printing apparatus. FIG. 6 is a flow chart showing the operation of the prior art which is to be performed upon reception of data from a host computer.

Referring to FIG. 5, reference numeral 501 denotes a printing apparatus main body; 502, a host computer (host) for sending data to the printing apparatus main body 501; 503, a input unit for receiving the data sent from the host 502; 504, a print processing unit for generating a video signal of each print page by analyzing the data of a print job; 505, a central processing unit for controlling the overall printing apparatus 501; 506, an output unit for the video signal of each page sent from the print processing unit 504 onto a printing paper sheet and outputting it; 507, a paper cassette for storing and supplying printing paper sheets; and 508, an operation unit that is used by a user to set a printing mode and the like.

Conventionally, print data which is described in a printer language starting with a print start command and ending with a print end command (FIG. 8) is sent from the host 502 to the printing apparatus 501 shown in FIG. 5.

In a peripheral device such as a printer, data received from a host computer includes print data that is to be actually printed and expressed in a page description language (PDL), which is bracketed by command information called a job language (JL). With this data, control on a print job and the like are performed. The JL is independent of the PDL but is expressed by the same text sequence.

The data sent from the host 502 is received by the input unit 503 (step S601 in FIG. 6). The input unit 503 determines that any data starting with a print start command is a print job, and handles the subsequent data as one print job up to the detection of a print end command.

Upon detection of a print start command (JL), the input unit 503 sends a job start notification to the central processing unit 505. Upon reception of the job start notification, the central processing unit 505 instructs the print processing unit 504 to start print processing for the currently received print job.

Upon reception of this instruction, the print processing unit 504 loads the data from the input unit 503 and prints the currently received print job (step S602).

Upon analyzing the data of the print job and completing a 1-page video signal, the print processing unit 504 sends the video signal to the output unit 506, and generates a video signal for the next page. Upon reception of the video signal, the output unit 506 receives a paper sheet from the paper cassette 507, prints out the video signal onto the paper sheet, and discharges it. When the print processing unit 504 processes the print job up to the print end command (YES in step S603), the print processing unit 504 sends a print end notification to the central processing unit 505.

The print processing unit 504 continues processing for the received print job until the print end command (JL) is received (NO in step S603).

When another print job is sent from the host 502, the print processing unit 504 performs the same processing as described above. Consider, for example, print jobs A and B, as shown in FIG. 8.

When print jobs are continuously sent from the host 502, the central processing unit 505 may receive a print start notification of the next print job from the input unit 503 before receiving a print end notification of the preceding print job. In this case, the central processing unit 505 instructs the print processing unit 504 to start printing the next print job after receiving the print end notification of the preceding print job from the print processing unit 504.

Upon completion of a print job A 801 (FIG. 8), print processing for a print job B 802 is started.

If, therefore, it takes much time to analyze a print job in the print processing unit 504, another subsequent print job cannot be quickly executed/managed.

FIG. 14 is a block diagram showing the schematic arrangement of a printing system that acquires information and sets environment in such a conventional printing system.

In the conventional printing system, a host computer 109 is connected to a printing apparatus 110 through a predetermined communication medium 1413.

The host computer 109 includes an application unit 1401, a printer driver unit 1402, a transmission buffer 1403, an I/F (interface) driver unit 1404, and a utility unit 1405.

The application unit 1401 provides the user with a graphical user interface and generates image data suited to user's purpose. The printer driver unit 1402 converts the image data generated by the application unit 1401 into page description language (PDL) data that can be printed.

The transmission buffer 1403 temporarily stores the PDL data generated by the printer driver unit 1402. The I/F driver unit 1404 transmits the PDL data stored in the transmission buffer 1403 to the printing apparatus 110, and transmits/receives information to/from the printing apparatus 110. The utility unit 1405 acquires information from the printing apparatus 110 to provide it for the graphic user interface, or changes the environment settings in the printing apparatus 110 in accordance with a request from the user.

The printing apparatus 110 includes an I/F driver unit 1406, a reception buffer 1407, a JL (job control language) parser unit 1408, a PDL translator unit 1409, a rendering buffer 1410, a rendering unit 1411, a printer engine unit 1412, and a device database unit 1413. The I/F driver unit 1406 receives PDL data transmitted from the host computer 109, transmits information about the printing apparatus 110, and receives environment setting information. The reception buffer 1407 temporarily holds the entire data received through the I/F driver unit 1406 to buffer any delay in subsequent processing.

The JL parser unit 1408 analyzes the received data and determines, on the basis of predetermined JL information, whether the data supplied indicates information about the printing apparatus 110 or PDL data, thereby sending the data to the corresponding processing. The PDL translator unit 1409 performs PDL translation processing for the PDL data sent from the JL parser unit 1408, thereby converting the data into intermediate data as a rendering object suitable for rendering. The device database unit 1413 stores the information about the printing apparatus 110 which is set by the JL and acquires the information by the JL, or supplies it to the PDL translator unit 1409 on the subsequent stage. In this case, environment information indicates, for example, the number of copies.

The rendering buffer 1410 temporarily stores the intermediate data of the rendering object generated by the PDL translator unit 1409 until it is actually printed. The rendering unit 1411 generates image data as a bitmap image by actually rendering the rendering object temporarily stored in the application unit 1401. The printer engine unit 1412 receives the bitmap image generated by the rendering unit 1411, and prints it on a medium such as a paper sheet by a known printing technique.

The job control language (JL) will be described next. A print data transmission means using the JL will be described first.

JL (Job Language) data is data that is generated and transmitted by the printer driver unit 1402 of the host computer 109, together with PDL data, and has a text type structure. JL data includes an escape character expressed as <ESC>. For example, the JL indicates finishing the processing performed by the PDL translator unit 1409 that has been operating, and passing control to the JL parser unit 1408 to start parser processing, or transferring control to the PDL translator unit 1409 called "LIPS" (trademark of CANON. INC.) to perform PDL translation and rendering. With the above function of the JL, the printing apparatus 110 can properly switch and print print data made up of different types of PDLs.

Means for acquiring information from the printing apparatus 110 and setting environment information therein by using the JL will be described next. For example, the JL includes a command generated by a utility unit 1405 of a host computer 109 and a command for acquiring the initial value of the number of copies (COPIES) set in the printing apparatus 110 from the printing apparatus 110. Note that the information "COPIES" is an example, and other pieces of environment information about the printing apparatus 110 can be acquired from corresponding character sequences. The JL also includes a command generated by the utility unit 1405 of the host computer 109, and a command to set the initial value of the number of pages to be printed by the printing apparatus 110 to "X". With the above function of the JL, the host computer 109 can acquire and set information about the printing apparatus 110.

The following three problems are, however, posed in print processing performed in units of print jobs by using the JL as in the prior art.

The overall load of a job cannot be detected unless data (PDL), of the data received from the host computer, which is to be actually printed is analyzed to the end.

No job can be recognized unless PDL data is interpreted.

Job management cannot be performed before PDL data is interpreted.

FIG. 2 is a block diagram schematically showing processing for a print job in the print processing unit 504 in an embodiment of the present invention. According to the prior art, job management is allowed only from a queue 204 and the subsequent steps in FIG. 2.

Since a print job is processed as serial information, when a plurality of print jobs are continuously input, print processing for a preceding print job must be completed to process the subsequent print job without any wait. More specifically, according to the prior art, as is obvious from the structure of the printing apparatus 110 in FIG. 14, a print job is temporarily stored in the reception buffer 1407 before the job is interpreted by the JL parser unit 1408 that recognizes the job. For this reason, the print data input to the reception buffer 1407 is not recognized as a print job, failing acquisition and setting of information about all print jobs input to the printing apparatus 110.

In addition, the print data generated by the application unit 1401 of the host computer 109 is converted into PDL data by the printer driver unit 1402 and is transmitted to the printing apparatus 110 through the transmission buffer 1403 and the I/F driver unit 1404. When acquisition of information about the printing apparatus 110, setting of information, or job control is to be performed through the utility unit 1405 during data transmission, since exclusive control is performed by the I/F driver unit 1404, a request from the utility unit 1405 cannot be satisfied until the above PDL data is completely transmitted. This impairs the real-time performance.

Also, since the execution of print processing depends on the state of preceding print processing, the output timing and the like of a subsequent print job is unknown, requiring an excess wait time. Since all print jobs are processed uniformly regardless of the priority levels, even the execution of a job with a high priority must be suspended until the preceding print job is finished.

SUMMARY OF THE INVENTION

The present invention has been made in consideration of the above situation, and has as its object to provide a printing control apparatus which brackets or delimits data received by peripheral devices such as a printing apparatus by command information as in the prior art, and can recognize a job by only analyzing command information without interpreting the entire PDL data to be output by storing the command information itself or the data size following the command information in the command information, and includes a command print processing unit for analyzing the command information upon reception of data and a means for holding the job information analyzed by the command print processing unit, thereby allowing management/control of jobs on a sequence of processing immediately after data reception or following data reception, a printing control method, a storage medium storing a printing control program, and a printing control system.

In order to achieve the above object, the present invention comprises the following arrangements.

That is, there is provided a printing control apparatus for analyzing a print job and printing the print job, comprising:

input means for inputting a print job in which printing management data and print data are separately set;

analyzing means for analyzing the printing management data of the print job input by the input means; and management information storage means for storing printing management data for managing the print job on the basis of the analysis result obtained by the analyzing means, wherein the printing management data can be stored in the management information storage means without analyzing the print data of the print job using the analyzing means.

When analysis of a new print job is started, the analyzing means assigns job identification information to the print job, sets the job identification information in a job management table generated in the management information storage means, and stores the print management data.

This apparatus further comprises:
data conversion means for converting print data, of the print job, which is to be printed into intermediate data;
intermediate data storage means for storing the intermediate data obtained by the data conversion means; and
rendering means for generating image data to be printed from the intermediate data stored in the intermediate data storage means, and outputting the image data to a printing unit.

The printing control apparatus further comprises a printing unit including printing means for printing image data on a recording medium.

This apparatus further comprises job control means for, when job control data is input through the input means, performing control corresponding to contents of the control data for a print job specified by printing management data stored in the management information storage means on the basis of the print job and a control command designated by the job control data.

The print job includes a job packet including identification information for identifying the printing management data and the printing management data and a job packet including identification information for identifying the print data and the print data, and the job control data includes a job packet including identification information for identifying the control command and the control command.

This apparatus further comprises data attribute recognition means for recognizing identification information included in the input data input through the input means, transmitting input data recognized as a print job to the analysis means, and transmitting input data recognized as job control data to the job control means.

The input means is capable of two-way communication, and the job control means returns job information in a job management table set by job management data for print jobs stored in the management information storage means when the input job control data requests a list of print jobs in the printing control apparatus.

The identification information includes size information indicating a data size of data following the identification information.

The analysis means analyzes identification data of a job packet included in a print job, and skips the data by an amount corresponding to a size indicated by the size information included in the job packet when it is determined that the job packet currently being analyzed is print data.

When the input job control data indicates cancellation of printing, the job control means controls to stop print processing for a print job specified by a job identification number included in the job control data.

When the input job control data indicates suspension or resumption of printing, the job control means controls to suspend or resume print processing for a print job specified by a job identification number included in the job control data.

The job control means performs job control in the order of the analysis means, the data conversion means, and the rendering means.

The management information storage means further stores priviledge information indicating a priviledge to perform job control, and
the job control means performs job control on the basis of the priviledge information.

The priviledge information is set with an operation unit of the printing control apparatus.

The priviledge information is externally input through the input means.

The printing management data includes priority information, and the print processing order is changed on the basis of the priority information.

There are also provided a printing control method based on the above mechanism and a storage medium storing a printing control program.

In addition, there is provided a printing control system including a host computer and a printing control apparatus,
the host computer comprising:
generating means for generating print job; and
a job packet generating unit for generating a print job from a job packet including printing management data and identification information for identifying the printing management data and a job packet including print data and identification information for identifying the print data, and
the printing control apparatus comprising:
analysis means for analyzing the printing management data from the input print job; and
management information storage means for storing printing management data for managing the print job on the basis of the analysis result obtained by the analysis means,
wherein the printing management data can be stored in the management information storage means without analyzing the print data of the print job using the analyzing means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a schematic view showing a job management table in the first embodiment of the present invention;

FIG. 20 is a view showing a GUI on a utility window of the host computer in the present invention;

FIG. 22 is a view showing a job management table in the second embodiment of the present invention;

DETAILED DESCRIPTION OF THE PREFERRED EMBODIMENTS

First Embodiment

<Arrangements of Printing Apparatus and System>

The present invention will be described in detail below with reference to the accompanying drawings.

Figure 1:
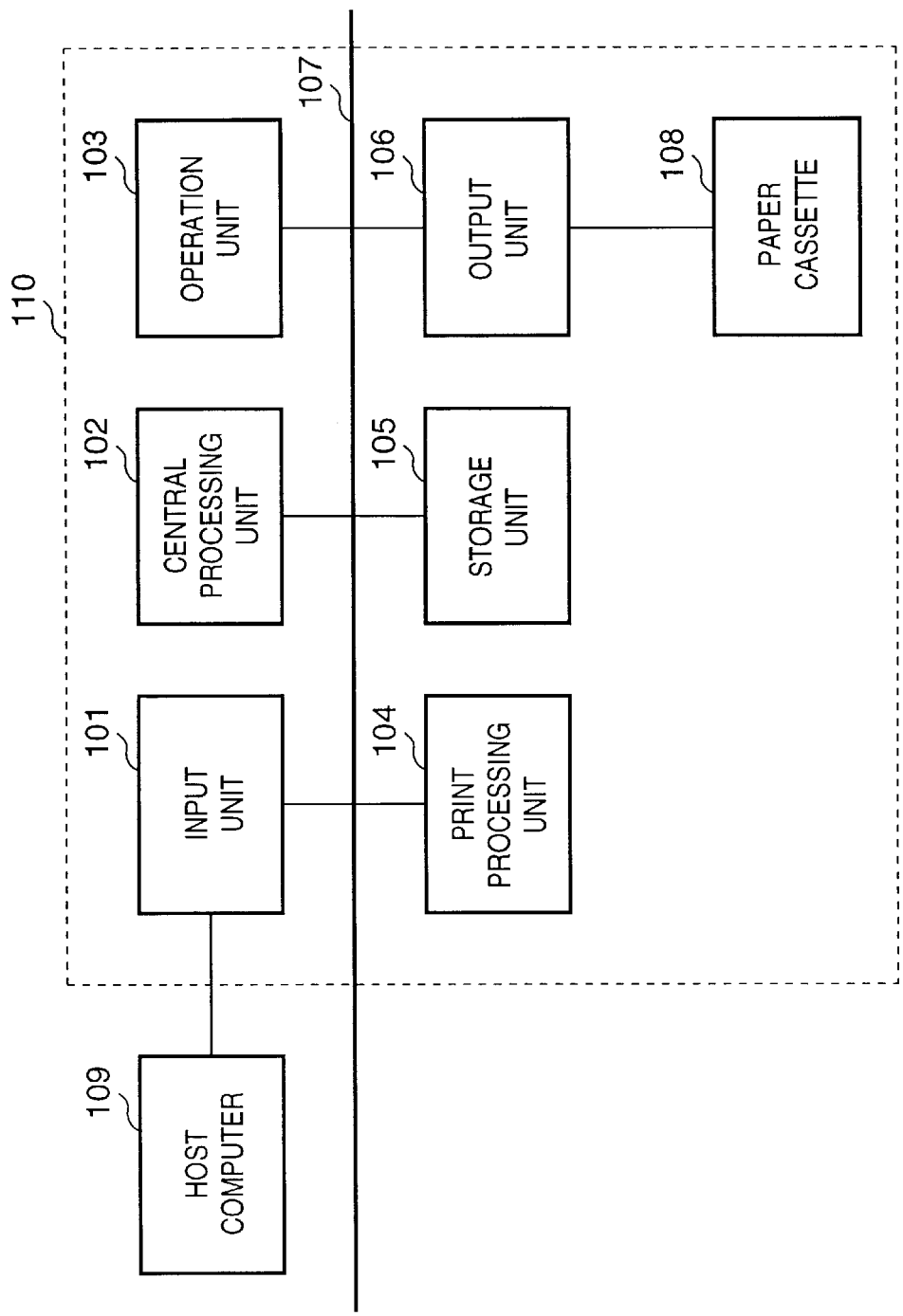
FIG. 1 is a block diagram showing a printing control apparatus according to the first embodiment of the present invention.

FIG. 1 is a block diagram showing a printing apparatus 110 including a printing control apparatus of the present invention.

Figure 3:
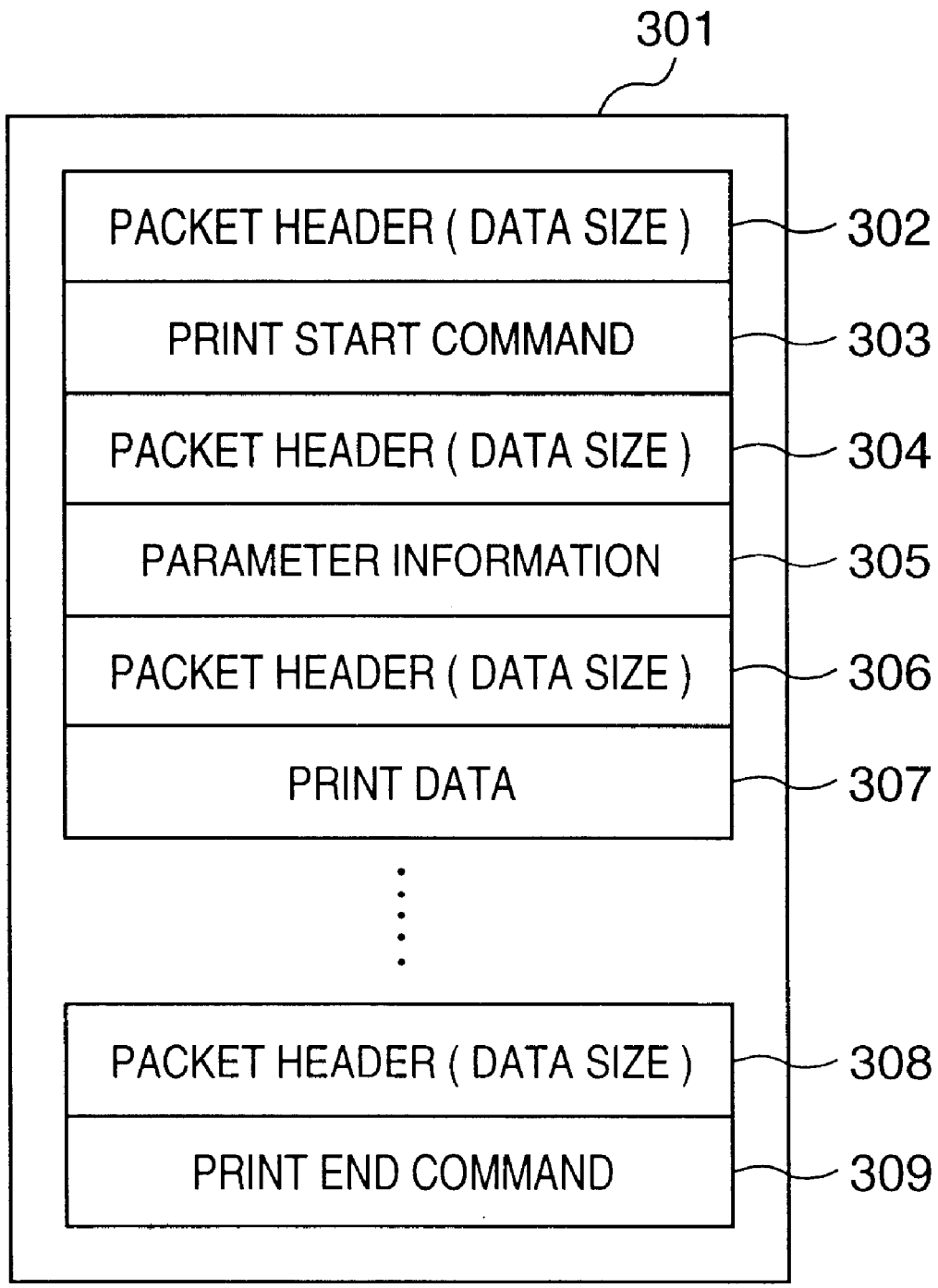
FIG. 3 is a view showing the format of communication data in the first embodiment of the present invention.
Figure 5:
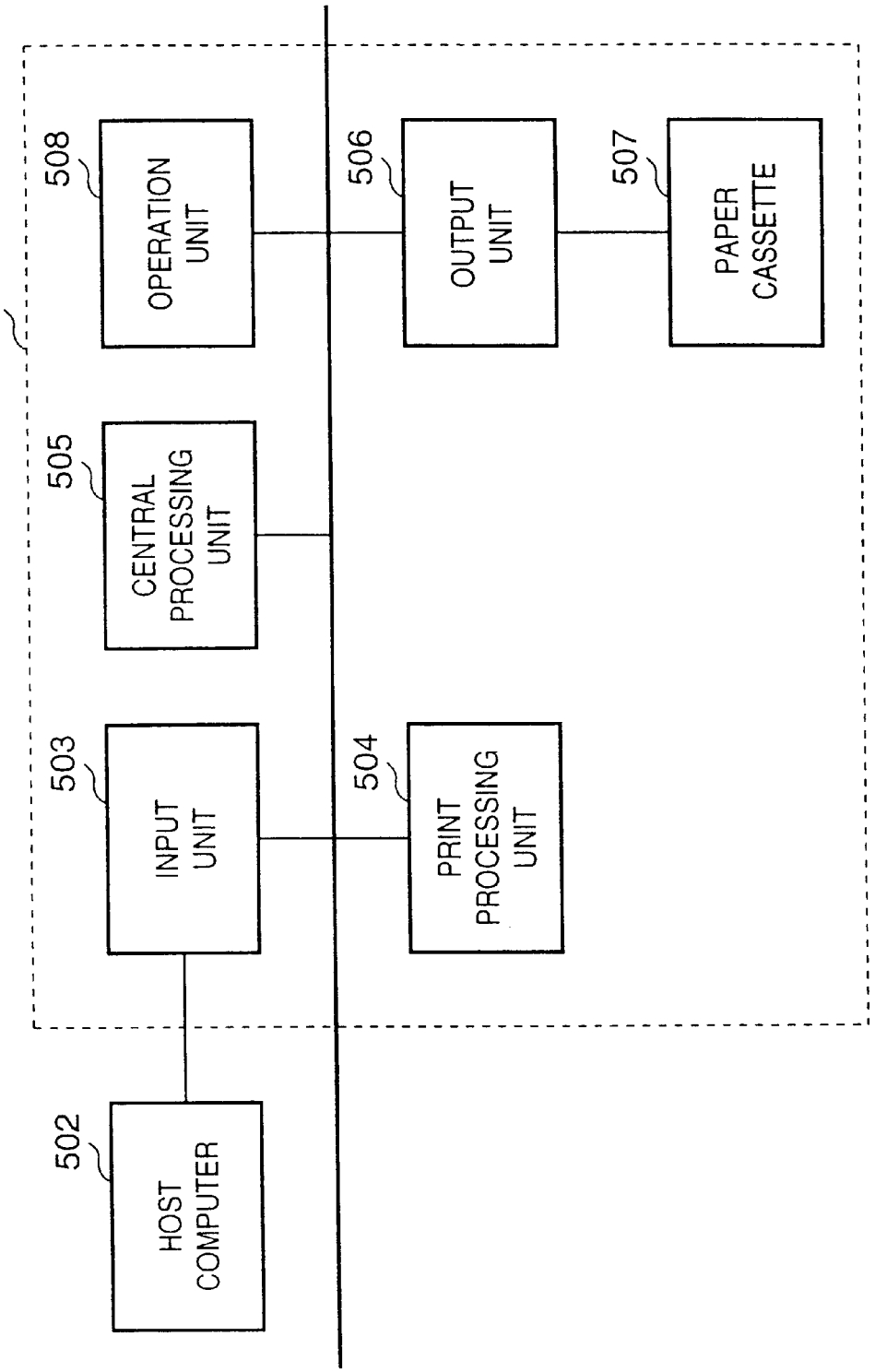
FIG. 5 is a block diagram showing a conventional printing control apparatus.
Figure 6:
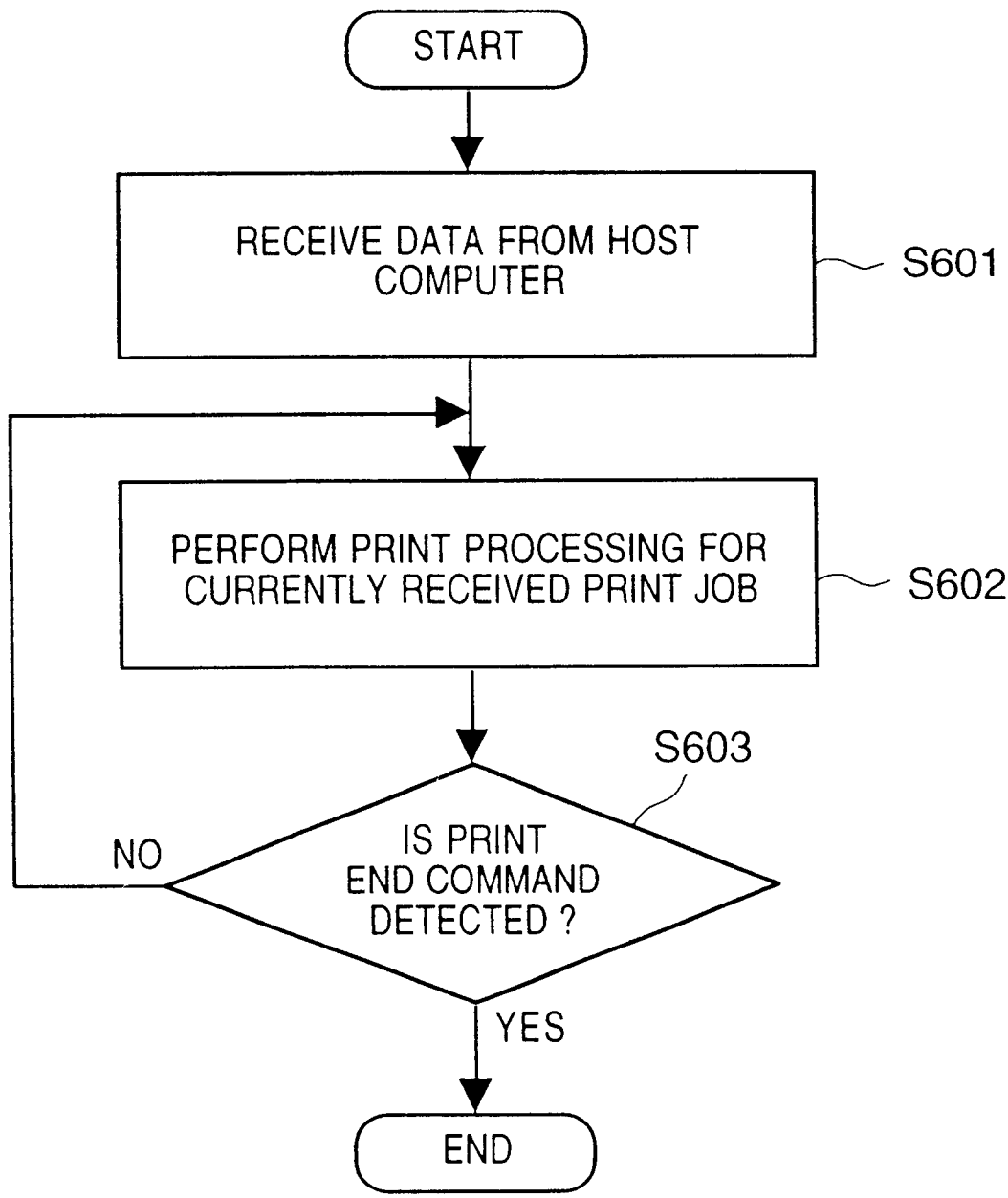
FIG. 6 is a flow chart showing the processing for a print job in the prior art.

An input unit 101 controls communication between this printing apparatus and a client such as a host computer 520. The input unit 101 can receive the print job data shown in FIG. 3. That is, the input unit 101 can receive information having a data structure composed of data for managing a print job, document data to be actually printed, data for printing control, and corresponding header portions added to the respective data. Referring to FIG. 3, each header information indicates a data size, but the type of data is not limited to this. For example, header information may be information for identifying data contents.

A central processing unit (CPU) 102 controls the overall printing apparatus 110.

An operation unit 103 provides an I/F to allow a user to directly operate this printing apparatus.

For example, a print processing unit 104 analyzes a command received through the input unit 101 and print data (PDL).

A storage unit 105 is made up of a ROM (Read-Only Memory) used to operate this apparatus, a RAM (Random-Access Memory), a secondary storage unit, and the like. The RAM is a data storage area on which no restriction in use is imposed. For example, this area is used as a reception buffer for the input unit 101 or for mapping data in the print processing unit 104.

An output unit 106 transfers the print data received through the input unit 101, which is mapped into printable image information by the print processing unit 104, onto a paper sheet. A paper cassette 108 supplies a paper sheet suitable for the processing performed by the output unit 106.

Figure 2:
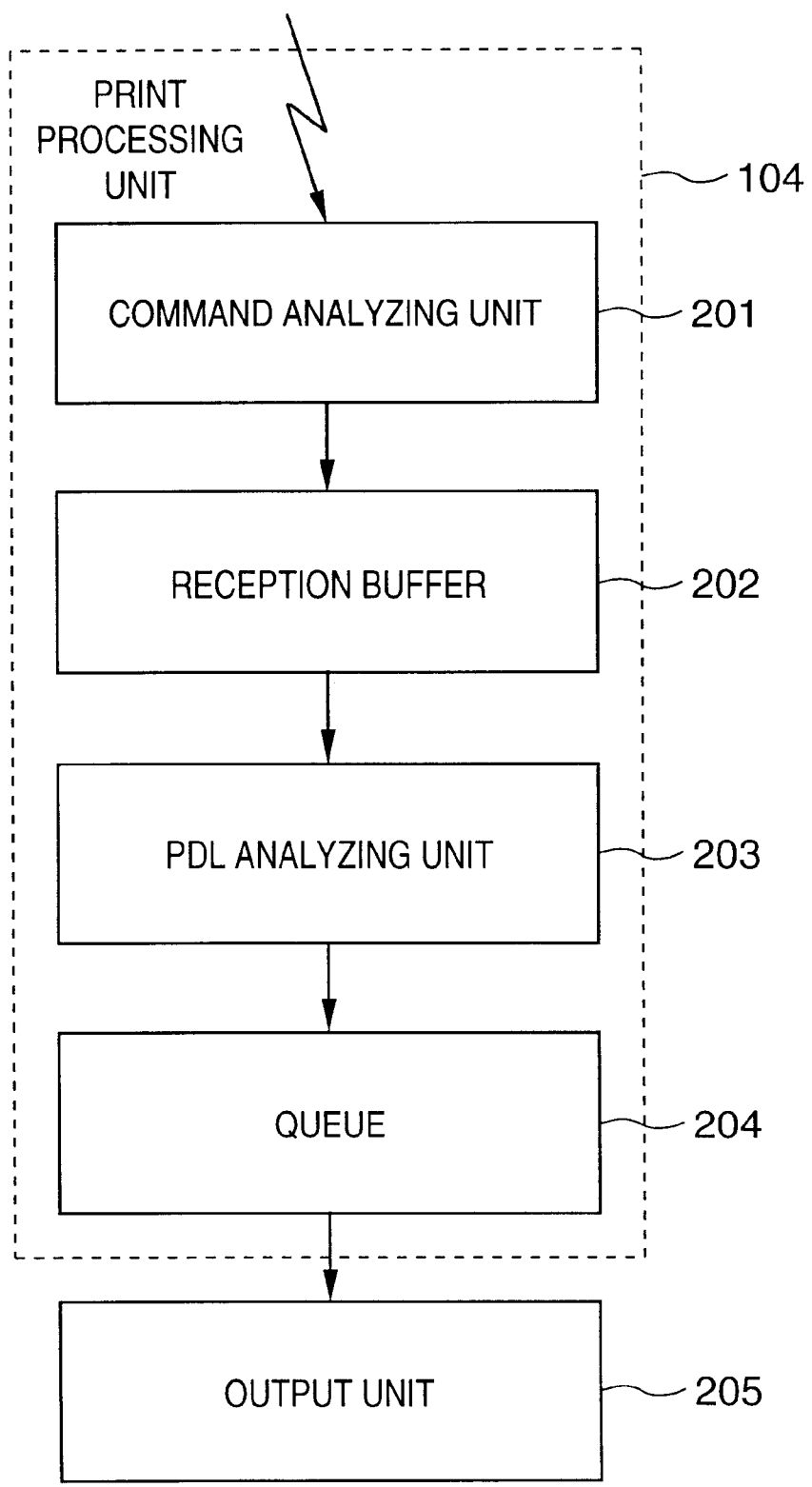
FIG. 2 is a block diagram expressing the processing performed in the first embodiment of the present invention.

FIG. 2 is a block diagram expressing print job processing in the present invention.

A command analyzing unit 201 sequentially analyzes the data received through the input unit 101, i.e., the commands of the print job shown in FIG. 3 (to be described later). Of the analyzed information, information to be managed as a job is stored in the job table shown in FIG. 4 (to be described later) and generated in the storage unit 105.

The information to be managed includes the reception order (job number or the like), the user name, the file name, the processing state, and the like.

A reception buffer 202 temporarily stores the actual output data, of the information analyzed by the command analyzing unit 201, in the storage unit 105.

A PDL analyzing unit 203 maps the print information (PDL) to be actually output, which is stored in the reception buffer 202, into printable image data.

The queue 204 sequentially stores information to be transferred to an output unit 205 (to be described later) in the storage unit 105.

The output unit (engine) 205 performs actual print processing, i.e., transfer of the print jobs sequentially stored in the storage unit 105 onto printing paper sheets.

<Generation of Print Data>

Print job data is generated by a host computer 109. In this embodiment, the host computer 109 functions as a data generating means.

Print job data can be mainly classified into three types of attributes, namely data for managing the print job, document data to be printed, and data for printing control. These data are described by command information. Each command information has corresponding header information added thereto. That is, header information and command information are paired. Print job data is data described by using one or a plurality of pairs of header information and command information.

FIG. 3 shows the arrangement of the print data received from the host computer 109.

Reference numeral 301 denotes a series of commands associated with one print process, i.e., a job command.

Reference numeral 302 denotes the packet header of a command 303 (to be described later). In this header, the data size of the command 303 is stored.

Reference numeral 303 denotes a command indicating the start of the job. The data ranging from this command to an end command 309 is data to be managed as one job.

Reference numeral 304 denotes the packet header of a command 305 (to be described later). In this header, the data size of the command 305 is stored.

Reference numeral 305 denotes a parameter setting command and set data.

Reference numeral 306 denotes the packet header of a command 307 (to be described later). In this header, the data size of the command 307 is stored.

Reference numeral 307 denotes print data (PDL information) to be actually printed.

Reference numeral 308 denotes the packet header of the command 309. In this header, the data size of the command 309 is stored.

Reference numeral 309 denotes an end command, which is paired with the job start command 303 to identify the job information.

Note that each of the above packet headers 302, 304, 306, and 308 may contain information other than the size of the subsequent command, e.g., packet identification data. Information other than the data size of each subsequent command is not specifically limited.

Packet header information is not limited to a single type of information, and a plurality of types of information may be written together. For example, data size information and identification data indicating whether the data is control data or document data to be go printed may be written together. Packet header information will be described in detail later with reference to FIG. 16.

The print job 301 is transmitted/received in units of packets each including a packet header and a parameter as one data fragment. In this case, the word "packet" is not used as a narrower term meaning a packet in network data communication, but is used as a broader term meaning a data fragment.

The information bracketed by the print start command 303 and the print end command 309 is handled as one print job unit.

Figure 16:
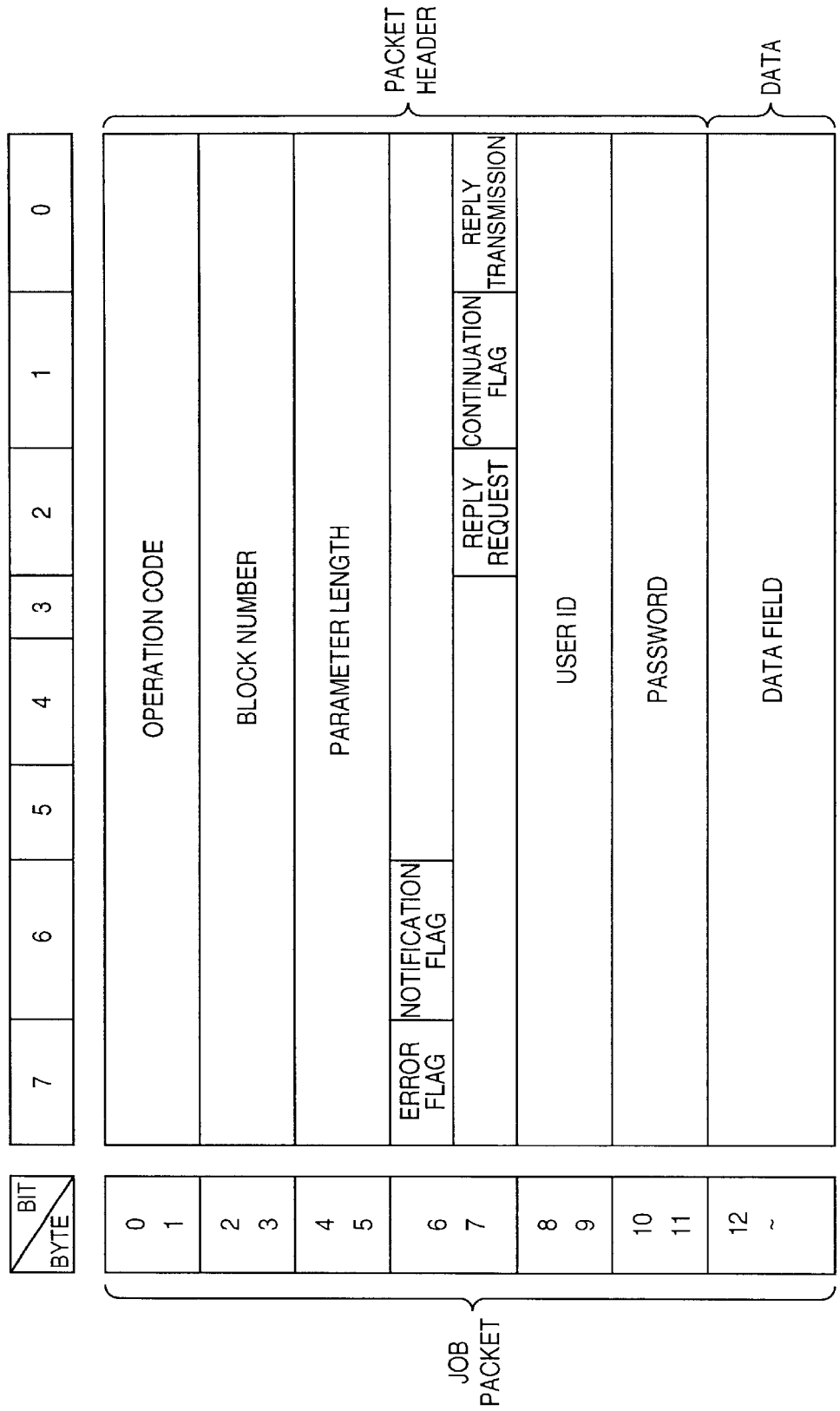
FIG. 16 is a view for explaining the format of packet header information.

FIG. 16 is a view for explaining the structure of packet header information. The ordinate indicates the bytes; and the abscissa, the bits of the respective bytes. Referring to FIG. 16, "operation code" at the zeroth and first bytes indicates a 2-byte ID indicating the function of the packet. The operation code can take the following values:

0x0201: job start operation
0x0202: job attribute setting operation
0x0204: PDL data transmission operation
0x0205: job end operation
0x301: job control operation In this case, "0x" means hexadecimal notation. In the packet header 302, the operation code takes the value of the job start operation "0201". In the packet header 304, the operation code takes the value of the job attribute setting operation "0202". In the packet header 306, the operation code takes the value of the PDL data transmission operation "0204". In the packet header 308, the operation code takes the value of the job end operation "0205". "Job control operation" is added to the packet header of a job control command transmitted from the host computer 109 to the printing apparatus 110. The operation code takes the value of the job control operation "0301". The job control operation is used for the processing to be described later with reference to FIG. 19.

"Block number" at the second and third bytes is a number used to check the correspondence between a request and a reply when the transmitting side of the job packet requests the reply. If, for example, an error packet having a block number of 2 is sent back from the printing apparatus 110 after job packets having job numbers of 1, 2, and 3 are consecutively transmitted from the host computer 109, the transmitting side can specify that an error has occurred in the second transmitted job packet.

"Parameter Length" at the fourth and fifth bytes is a field indicating the byte length of the data field after the 12th byte. This area can indicate 0 to 64 KB. The parameter length varies depending on the attribute indicated by the packet header.

The sixth and seventh bytes correspond to a field indicating the respective flags of the job packets. These flags take the following values.

Error flag: "1" indicates that some error has occurred in the printing apparatus 110. This flag is added to a replay packet sent from the printing apparatus 110 to the host computer 109.

Notification flag: "1" indicates that the printing apparatus 110 has information which it wants to notify the host computer 109 other than a reply to a request packet from the host computer 109.

Continuation flag: "1" indicates that since all the data cannot be set in the data field, the remaining data is sent using the next job packet. An operation code identical to that of the preceding packet must be set in the next job packet.

Reply request: When transmission of a reply packet from the host computer 109 to the printing apparatus 110 is required, "1" is set. When this value is 0, no reply is transmitted if the request packet is properly processed. When an error has occurred in the printing apparatus 110, a reply packet with an error flag of "1" is always transmitted regardless of the value (0 or 1) of the reply request.

"User ID" at the eighth and ninth bytes and "password" at the 10th and 11th bytes are areas used for authentication when operation that can be performed by using request packets is restricted for security reasons.

In the area corresponding to the 12th and subsequent bytes, data (parameters and PDL data) corresponding to the operation code is stored. No data are present in the packets of the job start operation and the job end operation.

In the job attribute setting operation, job attribute IDs to be set and job attribute values are set. Job attribute IDs are identifiers corresponding to attributes or environments associated with a job. IDs corresponding to the attributes of jobs defined by ISO-10175 (DPA) (ISO: International Organization for Standardization) are assigned in advance. The following are typical examples of job attributes:

0x0101: job name
0x0103: job owner name
0x016a: job size

In the PDL data transmission operation, PDL data is set in the data field. Data can be stored in one job packet up to the maximum size that can be stored in the above parameter length, and can be stored up to 64 KB. Data exceeding this size is divided and transmitted in a plurality of PDL data transmission operations. In this case, the above continuation flag is set to "1".

Figure 15:
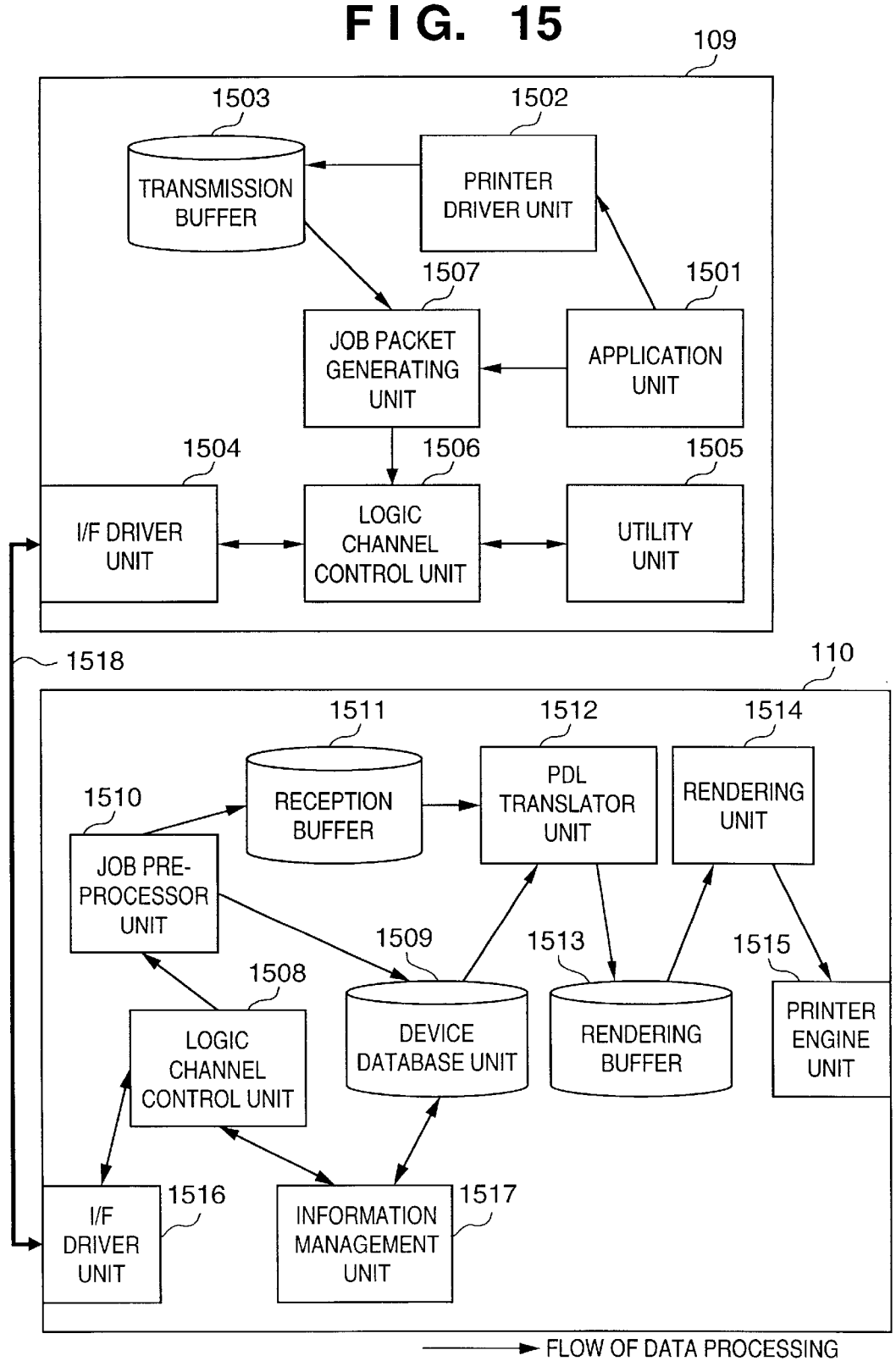
FIG. 15 is a functional block diagram showing a printing control apparatus according to the embodiment of the present invention.

FIG. 15 is a block diagram showing the schematic arrangement of a printing system according to the first embodiment of the present invention. In the printing system according to the first embodiment of the present invention, the host computer 109 is connected to the printing apparatus 110 through a predetermined communication medium 1518 capable of two-way communication. In the first embodiment of the present invention, as the communication medium 1518, for example, a local interface defined by IEEE (Institute of Electrical and Electronics Engineers) 1284 is used.

The host computer 109 of the printing system according to the first embodiment of the present invention includes an application unit 1501, a printer driver unit 1502, a transmission buffer 1503, an I/F driver unit 1504, a utility unit 1505, a logic channel control unit 1506, and a job packet generating unit 1507.

The functions of the respective units will be described below. The application unit 1501 provides the user with a graphical user interface and generates image data suited to user's purpose. The printer driver unit 1502 converts image data generated by the application unit 1501 into page description language (PDL) data that can be printed by the printing apparatus 110. The transmission buffer 1503 temporarily stores the PDL data generated by the printer driver unit 1502. The job packet generating unit 1507 generates job packet data from the PDL data stored in the transmission buffer 1503.

The utility unit 1505 acquires information about the printing apparatus 110 and supplies it to the graphical user interface, and changes the environment settings in the printing apparatus 110 in accordance with a request from the user. The logic channel control unit 1506 sets the job packet data sent from the job packet generating unit 1507 as data for a data channel, and also sets the state acquisition/environment setting data transmitted/received to/from the utility unit 1505 as data for a management channel. The logic channel control unit 1506 then forms the data to be sent through the two logic channels into a packet, thus converting the data into data for one physical channel. That is, since a communication medium 1518 is physically a one two-way interface (IEEE 1284 interface in this embodiment), the logic channel control unit 1506 is used to transmit/receive two different types of data through one interface.

The logic channel control unit 1506 in this embodiment controls multichannel communication by using the IEEE 1284. 4 communication scheme. According to the IEEE 1284. 4 communication scheme, data is transmitted/received in units of credits. In this scheme, a credit request is output first to transmit/receive data, and communication is performed by receiving a credit corresponding to the request. In this case, since two credits for management are always prepared independently of the credit for data transmission/reception, a control command can be received through a management channel (management credit) even during, for example, reception of print data in the printing apparatus.

The I/F driver unit 1504 transmits the PDL data stored in the transmission buffer 1503 to the printing apparatus 110 and transmits/receives information about the printing apparatus 110.

The printing apparatus 110 of the printing system according to the first embodiment of the present invention includes a logic channel control unit 1508, a device database unit 1509, a job pre-processor unit 1510, a reception buffer 1511, a PDL translator unit 1512, a rendering buffer 1513, a rendering unit 1514, a printer engine unit 1515, an I/F driver unit 1516, and an information management unit 15 17.

The functions of the respective units will be described in detail below. The I/F driver unit 1516 receives PDL data transmitted from the host computer 109, transmits information about the printing apparatus 110, and receives environment setting data.

The logic channel control unit 1508 converts the packet data received through the I/F driver unit 1516 into data sent to two logic channels, namely a data channel and a management channel, and sends them to the subsequent stage. That is, if the packet data received from the host computer 109 is a print job, the logic channel control unit 1508 transfers it to the job pre-processor unit 1510. If the packet data is packet data of a job management command used to control the job, the logic channel control unit 1508 transfers it to the information management unit 1517.

The job pre-processor unit 1510 corresponding to the additional information analyzing means of the present invention receives the data from the logic channel control unit 1508 through the data channel, and transfers the PDL data to the reception buffer 1511 or sets information in the device database unit 1509 in accordance with the operation code written in the packet header information (FIG. 16) of the job packet. As will be described later with reference to FIG. 7, if the job packet is a job start command, a corresponding job number is assigned to the command to set the job number in the job management table in the device database unit 1509, and sets job state information 406 corresponding to the job number to "receiving". If the job packet is PDL data command, the PDL data and the job number are transferred to the reception buffer 1511. If the job packet is a job attribute packet, parameter data is set in the job management table in the device database unit 1509. Upon storing all the PDL data corresponding to a given job number in the reception buffer 1511, the job pre-processor unit 1510 updates the job state information 406 in the job management table in the device database unit 1509 to "queued to print".

The reception buffer 1511 temporarily stores the PDL data to which the job number is assigned to buffer any delay in processing on the subsequent stage. The device database unit 1509 serves as a device database for the printing apparatus 110 and stores job information for rendering print jobs. The job management table in the device database unit 1509 will be described later with reference to FIG. 4.

The information management unit 1517 receives the management packet sent to the management channel, updates the information in the device database unit 1509 in accordance with the operation code and data written in the management packet, and controls the job in accordance with the data in the management packet. Job control will be described later with reference to FIG. 19.

The PDL translator unit 1512 translates the PDL data, converts the data into intermediate data of a rendering object suitable for rendering, and stores the resultant data in the rendering buffer 1513. Note that when the PDL translator unit 1512 recognizes the start of analysis of a job to which a new job number is assigned from the reception buffer 1511, the reception buffer 1511 updates the job state information 406 in the job management table in the device database unit 1509 to "analyzing".

The rendering buffer 1513 temporarily stores a rendering object until it is actually printed. When 1-page intermediate data is stored in the rendering buffer 1513, the rendering unit 1514 starts print processing.

The rendering unit 1514 actually renders the rendering object temporarily stored in the rendering buffer 1513 to generate a bitmap image, and transmits it to the printer engine unit 1515. The rendering unit 1514 updates the job state information 406 in the job management table in the device database unit 1509 to "printing" when generation of a bitmap image corresponding to a new job number is started.

The printer engine unit 1515 receives the bitmap image generated by the rendering unit 1514 and prints it on a medium such as a paper sheet by a known printing technique.

Figure 17:
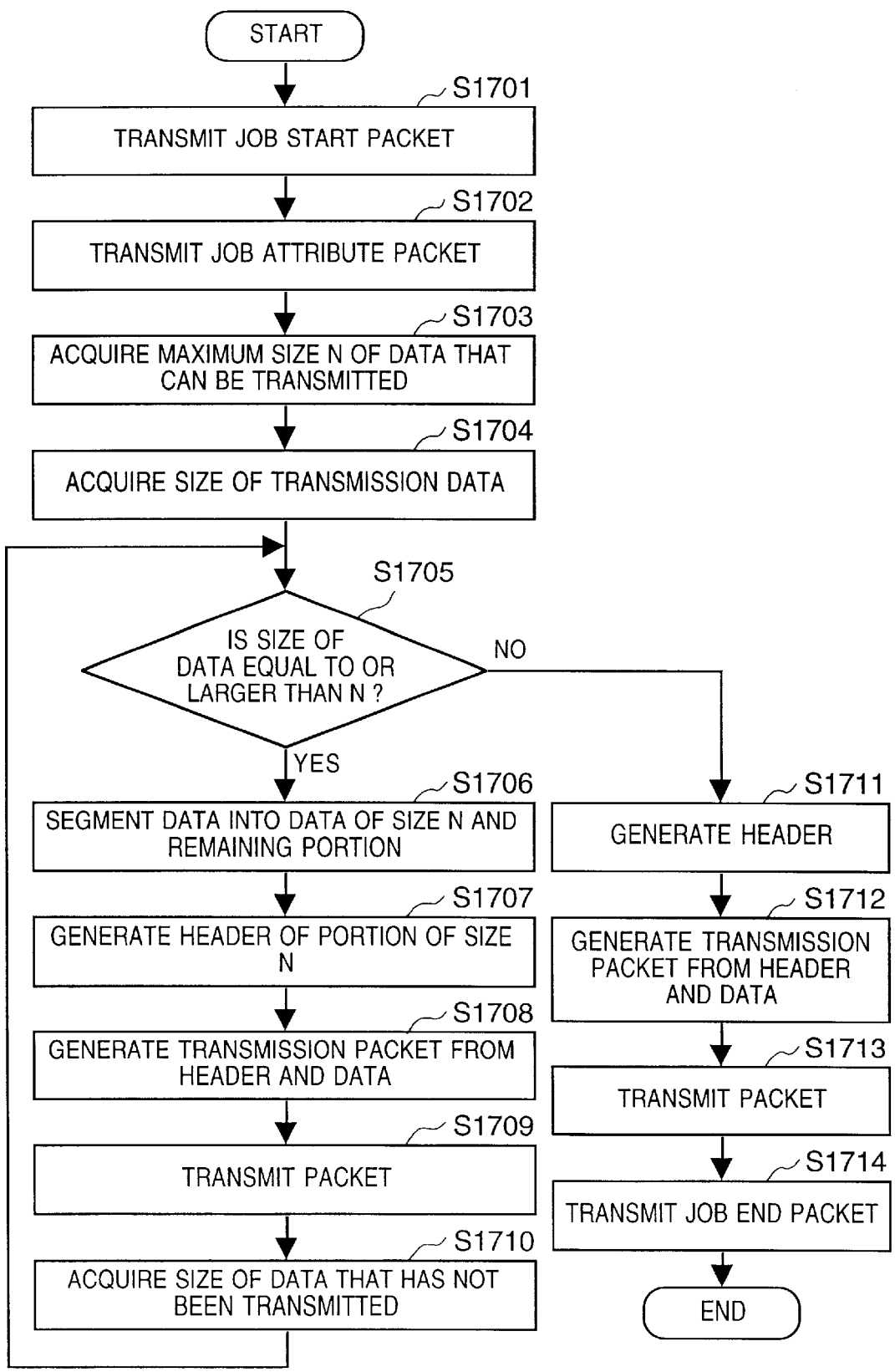
FIG. 17 is a flow chart showing control on job packet generation processing in a host computer in the present invention.

An example of control on job packet generation processing in the job packet generating unit 1507 of the host computer 109 will be described with reference to FIG. 17.

The user generates data as a basis of print data as a job packet to be transmitted by the host computer 109 by using the application unit 1501 of the host computer 109. However, a description of processing up to this operation will be omitted.

When the data output from the application unit 1501 is transmitted to the printer driver unit 1502 through a GDI (Graphical Device Interface) or the like, the printer driver unit 1502 generates PDL data on the basis of the data input from the GDI, and stores it in the transmission buffer 1503. When the PDL data is sequentially transmitted to the transmission buffer 1503, the job packet generating unit 1507 starts job packet generation processing.

In step S1701, the job packet generating unit 1507 generates a job start packet and transmits it to the logic channel control unit 1506. The job start packet is composed of the packet header 302 and the print start command 303 in FIG. 3. In this case, the operation code of the packet header (FIG. 16) takes the value "0201", as described above. A job identifier generated by the job packet generating unit 1507 is set in the data field in FIG. 16, which corresponds to the print start command 303.

In step S1702, the job packet generating unit 1507 generates a job attribute packet and transmits it to the job packet generating unit 1507. The job attribute packet is composed of the packet header 304 and the parameter information 305 in FIG. 3. In this case, the operation code of the packet header (FIG. 16) takes the value "0202", as described above. The attribute ID and the attribute value generated by the job packet generating unit 1507 are set in the data field in FIG. 16 which corresponds to the parameter information 305. As described above, the job attribute includes a job name, a job owner name, and a job size. In addition, an attribute such as a job request time, a job page count, or a color mode may be set. The printer driver unit 1502 can acquire the job name from the GDI. As the job owner name, the user name of the user at the time of log-on operation can be acquired from a function attached to the OS. The job size can be obtained by internal calculation of PDL data generated by the printer driver unit 1502.

In step S1703, the job packet generating unit 1507 acquires a maximum size N of data that can be transmitted. As described above, the maximum size of a job packet in this embodiment is 64 KB.

In step S1704, the job packet generating unit 1507 acquires the size of the data to be transmitted. That is, the job packet generating unit 1507 acquires the size of the PDL data stored in the transmission buffer 1503. In step S1705, the job packet generating unit 1507 checks whether the size of the transmission data (PDL data) acquired in step S1704 is larger than the maximum size N. If YES in step S1705, the flow advances to step S1706, in which the job packet generating unit 1507 breaks up the PDL data as the transmission data into a portion having the size N (64 KB in this case) and the remaining portion.

In step S1707, the job packet generating unit 1507 generates packet information (FIG. 16) corresponding to the portion having the size N of the segmented data. The operation code of the packet header information of this transmission data packet takes the value "0204", as described above. In addition, the continuation flag of the packet header is set to "1".

In step S1708, the job packet generating unit 1507 combines the packet header information with the transmission data (PDL) to generate a job packet as a transmission data packet. The PDL data is directly set in the data field of the job packet.

In step S1709, the job packet generating unit 1507 transmits the generated job packet to the logic channel control unit 1506.

In step S1710, the job packet generating unit 1507 acquires the size of the PDL data that has not been transmitted (the remaining portion of the segmented data), and the flow returns to step S1705.

If it is determined in step S1705 that the size of the transmission data is less than the maximum size N, the flow advances to step S1711, in which the job packet generating unit 1507 generates packet header information (FIG. 16) corresponding to the transmission data. The operation code of the packet header information of this transmission data packet takes the value "0204", as described above. In this case, the continuation flag of the packet header is set to "0".

In step S1712, the job packet generating unit 1507 combines the packet information with the transmission data (PDL) to generate a job packet as a transmission packet.

In step S1713, the job packet generating unit 1507 transmits the generated packet to the logic channel control unit 1506, and finishes the processing.

In step S1714, the job packet generating unit 1507 generates a job end packet and transmits it to the logic channel control unit 1506. The job end packet is made up of the packet header 308 and the print end command 309 in FIG. 3. In this case, the operation code of the packet header (FIG. 16) takes the value "0205", as described above. No parameter and data are actually present in the data field in FIG. 16 which corresponds to the print end command 309.

In this manner, the job packet is generated and transmitted from the host computer 109 to the printing apparatus 110 through the logic channel control unit 1506.

<Print Job Management>

FIG. 4 is a schematic view of a job management table storing job information according to the present invention. Of analyzed information, information to be managed as a job is managed with the job management table generated in the storage unit 105. The job management table is kept in the device database unit 1509.

In this embodiment, with "job number" 401, jobs are numbered in the order in which the printing apparatus receives them. More specifically, the job pre-processor unit 1510 of the printing apparatus 110 assigns a job number as job identification information to each received print job to make it unique in the printing apparatus 110, and stores the resultant data in the device database unit 1509.

"Queue number" 402 indicates the ascending order of processing in the queue 204 (reception buffer 1511).

In "user name" 403, the names of the users who input the jobs indicated by "job number" 401 are stored. More specifically, the logic channel control unit 1508, which has received a print job from the I/F driver unit 1516, acquires a job owner name from the job attribute packet of the print job, and transmits it to the information management unit 1517. The information management unit 1517 then stores the received job owner name as a user name in the device database unit 1509.

In "file name" 404, the file names stored in the queue 204 are stored. More specifically, the logic channel control unit 1508, which has received a print job from the I/F driver unit 1516, acquires a job name from the job attribute packet of the print job, and transmits the job name to the information management unit 1517. The information management unit 1517 then stores the received job name in the device database unit 1509. "Parameter list handle" 405 indicates an information table (not shown) in which parameters set for jobs are stored. More specifically, the logic channel control unit 1508, which has received a print job from the I/F driver unit 1516, acquires job attributes (the number of pages, the color mode, and the like) from the job attribute packet of the print job, and transmits them to the information management unit 1517. The information management unit 1517 stores the received job attributes as parameters in the device database unit 1509.

"Job state information" 406 indicates the current state of each job indicated by "job number" 401. More specifically, the information management unit 1517 recognizes "job number" 401 processed by the reception buffer 1511 (queued to print), the PDL translator unit 1512 (mapping), and the rendering unit 1514 (printing), and preferentially stores the job state of the processing unit closer to the printer engine unit 1515 in the device database unit 1509. If a job with the job number "2" is present in the PDL translator unit 1512 and the rendering unit 1514, since the rendering unit 1514 is closer to the printer engine unit 1515, "printing" is stored in "job state information" 406.

Note that the information indicated by this job management table is not limited to the above contents as long as jobs can be managed. In addition, the meaning of data is not specified like "queue number" 402.

<Processing/Execution of Print Job Data>

Figure 7:
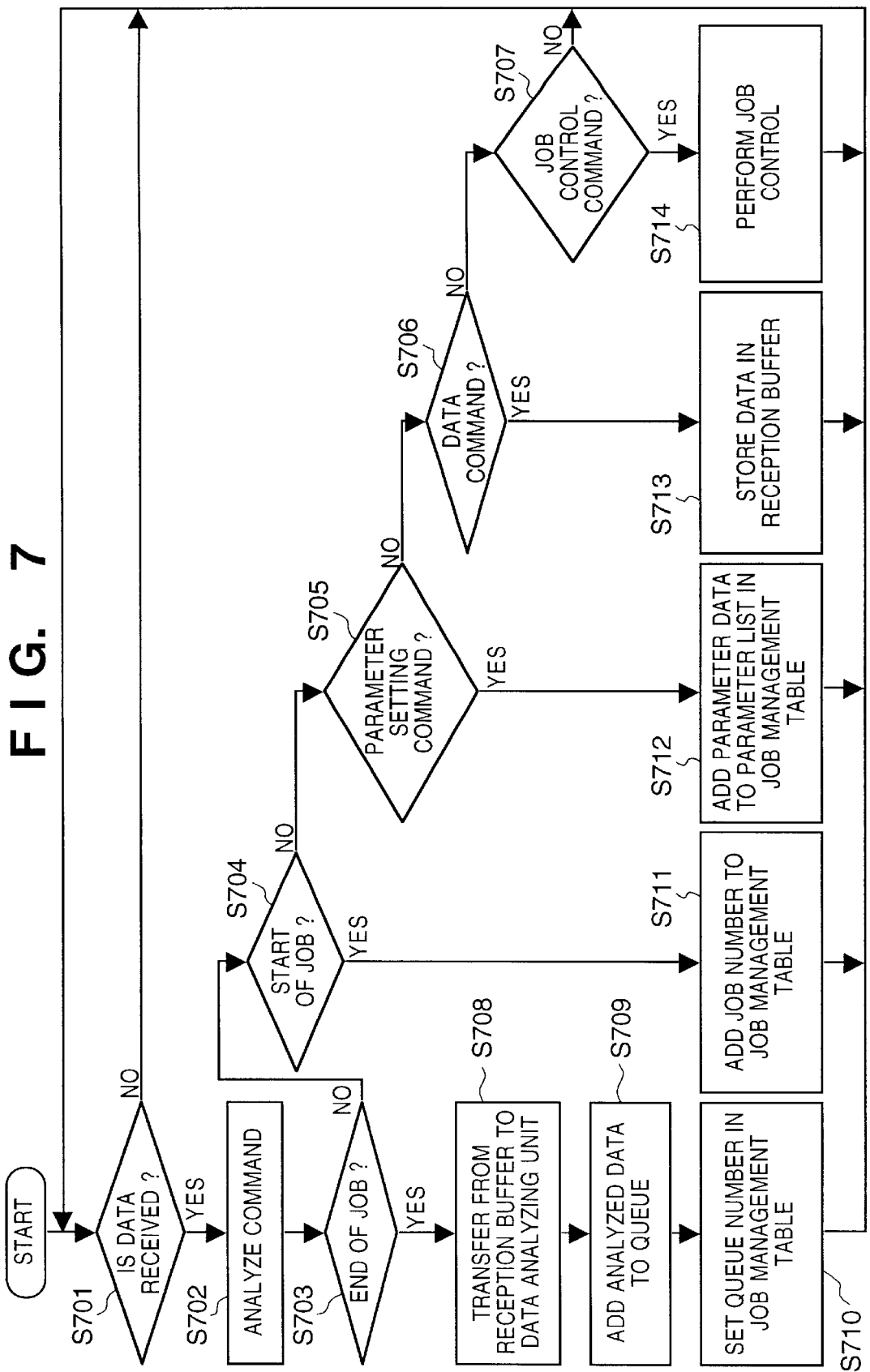
FIG. 7 is a flow chart showing the processing for received data in the printing control apparatus of this embodiment.
Figure 8:
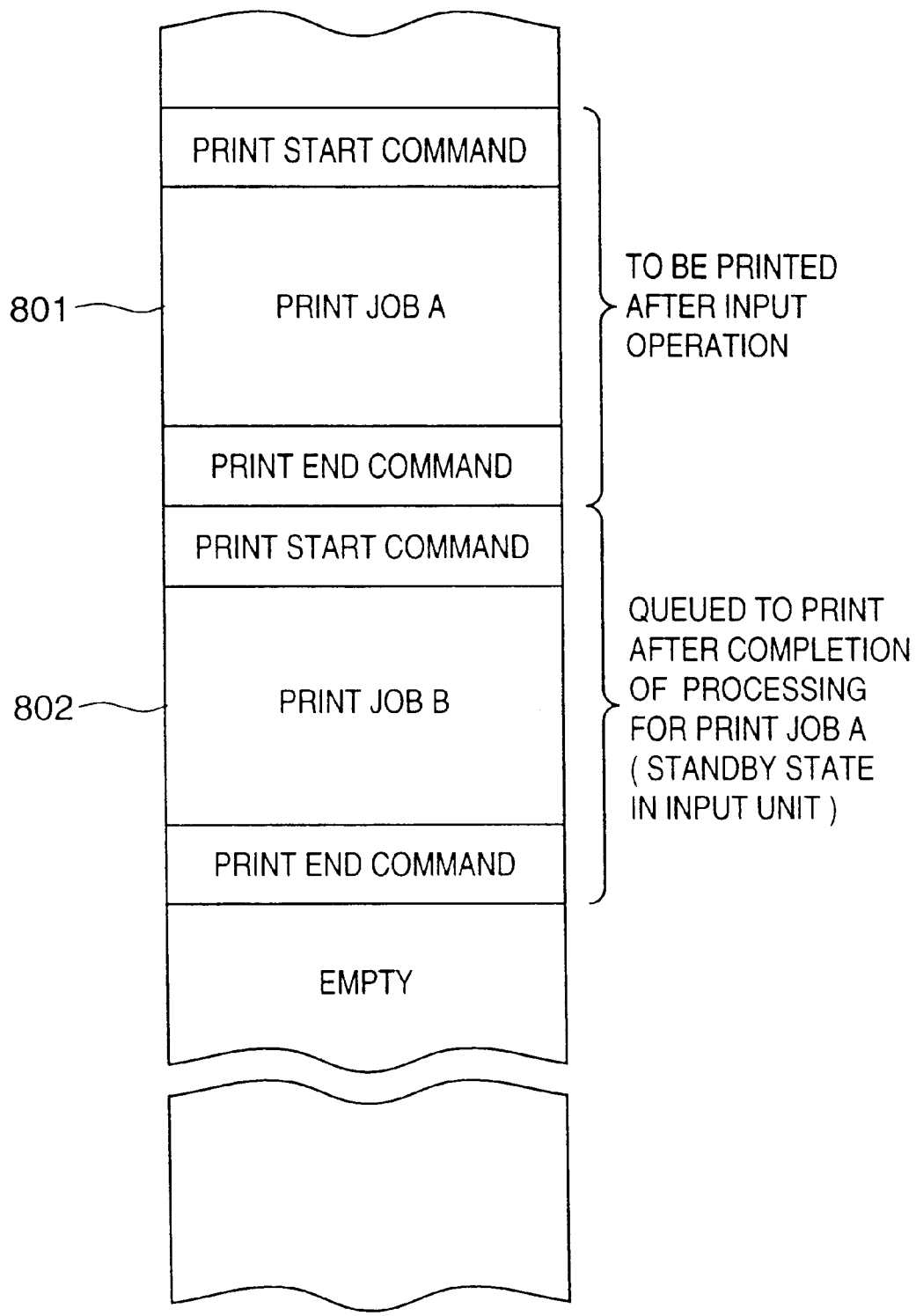
FIG. 8 is a view showing print job data.

FIG. 7 is a flow chart showing processing for input data in the printing apparatus 110. The input data can be mainly classified into three types of attributes, namely data for managing the print job, document data to be printed, and data for printing control. The command analyzing unit 201 analyzes the input data having this architecture.

When the I/F driver unit 1516 serving as the input unit 101 receives data from a host computer 502 (step S701), the logic channel control unit 1508 and the job pre-processor unit 1510 sequentially analyze the commands received by the I/F driver unit 1516 in step S702.

In step S703, the logic channel control unit 1508 checks whether the analyzed command is a job end packet. If YES in step S703, the flow advances to step S708.

If NO in step S703, the logic channel control unit 1508 checks in step S704 whether the analyzed command is a job start packet. If YES in step S704, the flow advances to step S711.

If NO in step S704, the logic channel control unit 1508 checks in step S705 whether the analyzed command is a job attribute packet as a parameter setting command. If YES in step S705, the flow advances to step S712.

If NO in step S705, the logic channel control unit 1508 checks in step S706 whether the analyzed command is a transmission data packet as a data command. If YES in step S706, the flow advances to step S713.

If YES in step S706, the logic channel control unit 1508 checks in step S707 whether the analyzed command is a job control command. If YES in step S707, the flow advances to step S714. If NO in step S707, it indicates that unexpected data has been input. The flow therefore returns to step S701.

In step S708, the logic channel control unit 1508 receives a job end command, and transmits a series of print job data, which have already been received, to the job pre-processor unit 1510. Note that the logic channel control unit 1508 need not transfer data to the job pre-processor unit 1510 after all the data are received as in this embodiment. This data transfer timing is not specified, and data may be sequentially transferred in specific size. For example, this transfer processing may be performed after step S711 to be described later.

In step S709, the data analyzed by the job pre-processor unit 1510 is stored in the reception buffer 1511. Note that the timing of data transfer from the job pre-processor unit 1510 to the reception buffer 1511 is not specified.

In step S710, the job pre-processor unit 1510 stores the data in the reception buffer 1511, and writes an appropriate number in "queue number" 402 of the job management table in FIG. 4, which is stored in the device database unit 1509.

In step S711, the job pre-processor unit 1510 receives a job start packet from the logic channel control unit 1508, and writes the job number 401 in the job management table in FIG. 4, which is stored in the device database unit 1509, thereby preparing for reception of a series of subsequent commands.

In step S712, the job pre-processor unit 1510 receives a job attribute packet from the logic channel control unit 1508, and adds desired data in "user name" 403, "file name" 404, and "parameter list handle" 405 of the job management table in the device database unit 1509.

In step S713, the job pre-processor unit 1510 receives a transmission data packet from the logic channel control unit 1508, and stores the PDL data set in the transmission data packet in the reception buffer 1511. In this case, the job pre-processor unit 1510 stores the data in the reception buffer 1511 by the parameter length contained in the packet header information of the transmission data packet without analyzing it. Print job data need not always be analyzed to search for the end of the PDL data as in the prior art. This shortens the processing time.

In step S714, the logic channel control unit 1508 transfers the job control command to the information management unit 1517. The information management unit 1517 searches the job management table in the device database unit 1509 for a job corresponding to the received job control command, and performs desired job control. This job control will be described later with reference to FIG. 19.

In this manner, the printing apparatus 110 processes the input data. In addition, as described above, since the communication medium 1518 can perform multichannel communication, the job packet of a job control command can be received even during reception of the job packet of print data. For example, cancel control like that described later with reference to FIG. 19 can be performed for a job in the process of reception.

Figure 18:
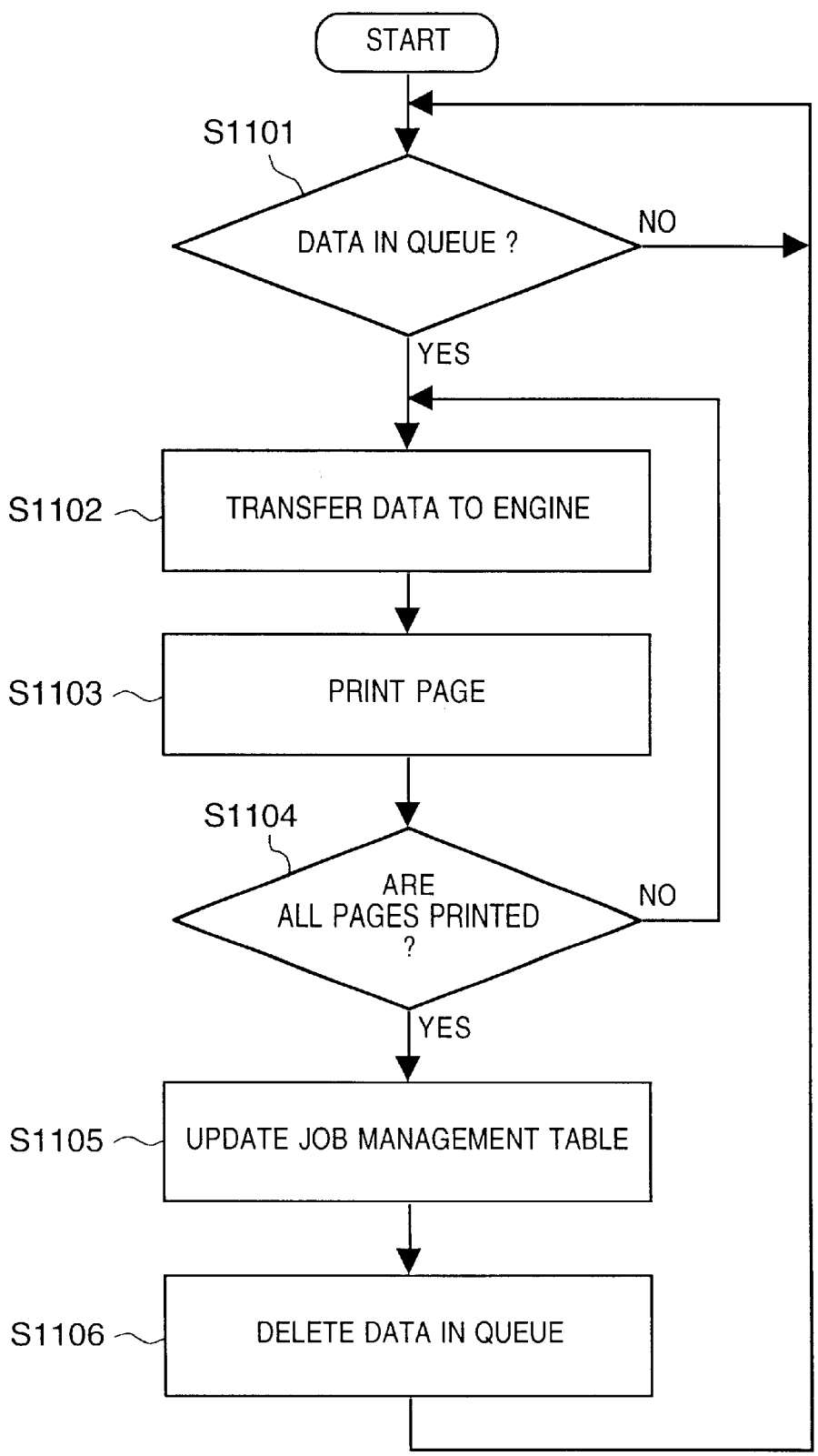
FIG. 18 is a flow chart showing control on print processing in the printing control apparatus of the embodiment of the present invention.

FIG. 18 is a flow chart showing the printing operation of a printing apparatus as an example of the printing control apparatus of the present invention.

In step S1801, the information management unit 1517 checks whether valid data is present in "queue number" 402 of the job management table in the device database unit 1509. If YES in step S1801, the information management unit 1517 recognizes that the data required for printing are stored in the job management table in FIG. 4, and the flow advances to step S1802. As described above, a job with a queue number is a job that has undergone job recognition and is ready to print.

In step S1802, print processing is started. More specifically, the information management unit 1517 transmits the job number of the job to be printed and a start command to the PDL translator unit 1512. The PDL translator unit 1512 acquires PDL data corresponding to the designated job number from the reception buffer 1511, converts the data into intermediate data upon PDL analysis, and stores it in the rendering buffer 1513. The information management unit 1517 or the PDL translator unit 1512 then updates the job state information 406 corresponding to the job number in the job management table in the device database unit 1509 from "queued to print" to "analyzing".

In step S1803, the rendering unit 1514 starts print processing after 1-page intermediate data stored in the rendering buffer 1513. More specifically, the rendering unit 1514 acquires the intermediate data stored in the rendering buffer 1513, generates bitmap data by rasterization, and outputs the data to the printer engine unit 1515. After the print processing is started, the information management unit 1517 or the rendering unit 1514 updates the job state information 406 corresponding to the job number in the job management table in the device database unit 1509 from "analyzing" to "printing". When 1-page data is printed, the information management unit 1517 or the rendering unit 1514 decrements the remaining page count information (not shown) corresponding to the job number in the job management table in the device database unit 1509 by one. In this manner, print processing for one page is performed.

Note that a means for determining that all the data required for printing have been prepared is not limited to the means in this embodiment.

In step S1804, the information management unit 1517 checks whether printing of all the pages of the print job is complete. If NO in step S1804, the flow shifts to step S1802 to continue print processing for the subsequent pages.

As indicated by the processing from step S1802 to step S1804, a transfer means for data required for printing is not limited to a means for transferring data in units of pages.

In step S1805, the information management unit 1517 deletes the job information of the print job having undergone print processing from the job management table in the device database unit 1509. Assume that the job information deleted in this step is temporarily stored in another area.

In step S1806, the data area obtained in step S1802 is released on the basis of the job information temporarily stored in step S1805. In this case, the data area is that area in the reception buffer 1511 and the rendering buffer 1513, which is occupied by the data (PDL data and intermediate data) of the print job.

Figure 19:
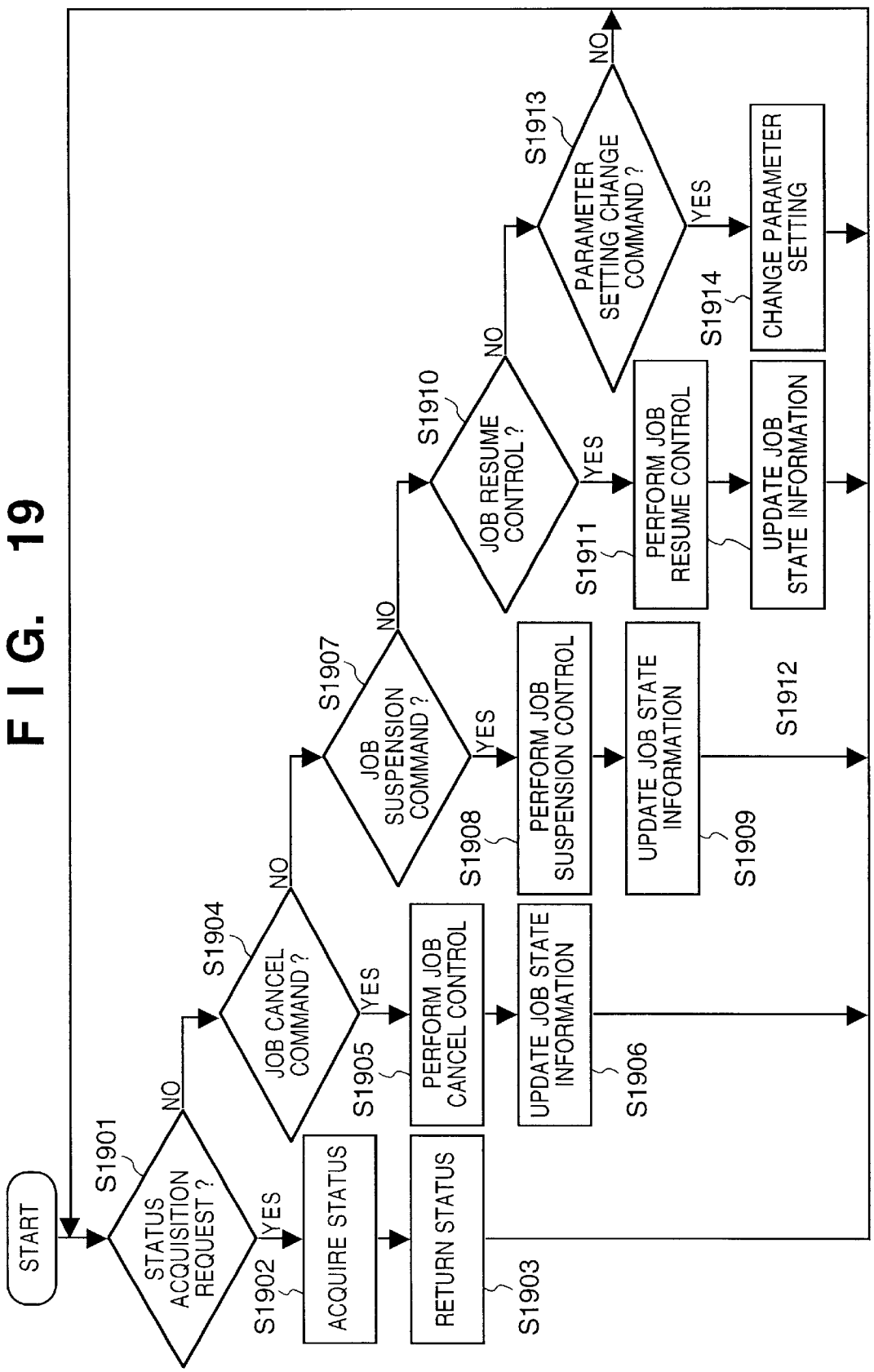
FIG. 19 is a flow chart showing job control in the printing control apparatus of the embodiment of the present invention.

FIG. 19 is a flow chart showing job control in a printing apparatus as an example of the printing control apparatus of the present invention. The processing in step S714 in FIG. 7 will be described in detail below. This processing is performed by transferring a job control command to the information management unit 1517 when the logic channel control unit 1508 receives the job control command in step S707.

A job control command is generated by the utility unit 1505 of the host computer 109. Job control commands include a status acquisition request command for requesting a job list in the printing apparatus, a job cancel command for requesting cancellation of a print job, a job suspension command for requesting temporary suspension of a print job, a job resume command for requesting the resumption of a suspended print job, a parameter setting change command for requesting a change in parameter of a print job, and the like. The respective job control commands are provided in the form of job packets, and vary in attribute depending on the types, as described with reference to FIG. 16.

In step S1901, the information management unit 1517 checks, on the basis of the attribute in the job packet, whether the received job control command is a status acquisition request command. If YES in step S1901, the flow advances to step S1902.

In step S1902, the information management unit 1517 acquires the job management table stored in the device database unit 1509. In step S1903, the information management unit 1517 transfers the information of each job in the acquired job management table to the I/F driver unit 1516 through the logic channel control unit 1508. The I/F driver unit 1516 converts the received information into information in the form of a packet, and returns the information to the host computer 109 through the communication medium 1518 based on IEEE 1284. With this operation, the host computer 109 can recognize the uniquely assigned job number in the printing apparatus 110.

FIG. 20 shows an example of the status monitor of the printing apparatus 110 which is displayed on the display unit (not shown) of the host computer 109. The job shown in "PRINTER JOB LIST" is a job currently processed in the printing apparatus 110. According to the prior art, the user can see only a job having undergone PDL analysis. In the present invention, however, the user can also check the status of a job that is being received.

Figure 21:
FIG. 21 is a view showing the GUI for designating job control on the utility window in the host computer in the present invention.

Assume that the user is to perform job control (cancellation, suspension, resumption, setting change, or the like) with respect to a given job on the utility window shown in FIG. 20. In this case, as shown in FIG. 21, when the user selects a document on the utility window with a pointing device such as a mouse, a job control window 2101 is newly displayed. The user can select desired job control. At this time, a job control command corresponding to the selected job control is generated by the utility unit 1505. This command is converted into a job packet, together with a designated job number, and the job packet is transmitted from the logic channel control unit 1506 to the printing apparatus 110. Since the uniquely assigned job number in the printing apparatus 110 can be acquired by returning a status request, job control can be performed.

If it is determined in step S1901 that the received command is not a status acquisition request, the flow advances to step S1904. In step S1904, the information management unit 1517 checks, on the basis of the attribute in the job packet, whether the job control command is a job cancel command. If YES in step S1904, the flow advances to step S1905.

In step S1905, the information management unit 1517 checks whether there is a job cancel priviledge, and cancels the job. First of all, the information management unit 1517 acquires the job number in the job packet which is the job cancel request transmitted from the host computer 109, and checks, on the basis of the attribute ID of the job packet, whether the user name corresponding to the job number coincides with the user name of the user who has transmitted the job cancel command. If they do not coincide with each other, since the user has no cancel priviledge, the processing in steps S1902 to S1903 is skipped without canceling the job. If they coincide with each other, since the user has a cancel priviledge, the information management unit 1517 acquires a job state information from the job management table in the device database unit 1509 which corresponds to the job. The information management unit 1517 performs job cancel control on the basis of the job state information. That is, if the job state information 406 indicates "printing", the information management unit 1517 performs job cancel operation at four portions.

The information management unit 1517 designates a job number and job cancel operation with respect to the job pre-processor unit 1510. Even if a job packet corresponding to the designated job number is received afterward, the job pre-processor unit 1510 discards the job packet without transmitting it to the reception buffer 1511. The information management unit 1517 then performs control to invalidate the corresponding job print in the reception buffer 1511. The reception buffer 1511 manages the job numbers assigned by the job pre-processor unit 1510, together with the respective PDL data, so that the correspondence between PDL data and job numbers is always grasped. This allows the information management unit 1517 to easily recognize a job that needs cancellation. The information management unit 1517 then transmits the job number and the cancel command to the PDL translator unit 1512. The PDL translator unit 1512 stops PDL analysis in accordance with the cancel command if the job corresponding to the received job number is being analyzed. If the PDL translator unit 1512 is analyzing a job corresponding to a job number different from the received job number, the PDL translator unit 1512 ignores the command. The information management unit 1517 then transmits the job number and the cancel command to the rendering unit 1514. If the rendering unit 1514 is rendering the job corresponding to the received job number, the rendering unit 1514 stops rendering the intermediate data in accordance with the cancel command. If the rendering unit 1514 is rendering intermediate data corresponding to a job number different from the received job number, the rendering unit 1514 continues processing until intermediate data corresponding to the designated job number is received.

If the job state information indicates "processing", the information management unit 1517 sends the job cancel command to the PDL translator unit 1512, and the flow shifts to step S1906. If the job state information indicates "queued to print", the information management unit 1517 completes the job cancel processing in the reception buffer 1511, and the flow advances to step S1906.

In this manner, job cancel control in the printing apparatus 110 is performed in accordance with the state of each job. In this job cancel operation, print processing of data is stopped in the order in which the data are located closer to the I/F driver unit 1516 to which jobs are input, i.e., from the upstream side of the data. If print processing of data is canceled in the order in which the data are located closer to the printer engine unit, data flows and some data cannot be deleted when cancel control shifts from a given job to another job. For this reason, perfect cancel control can be performed by deleting data from the upstream side.

In step S1906, the information management unit 1517 deletes all the information of the canceled print job in the job management table in the device database unit 1509.

If it is determined in step S1904 that the job control command is not a job cancel command, the flow advances to step S1907. In step S1907, the information management unit 1517 checks, on the basis of the attribute in the job packet, whether the job control command is a job suspension command. If YES in step S1907, the flow advances to step S1908.

In step S1908, the information management unit 1517 performs job suspension control. Job suspension control and priviledge determination are performed along the same flow of processing as that for job cancel control except that temporary saving is performed in place of cancellation (deletion). In this case, only the PDL data in the reception buffer 1511 is saved, but intermediate data is deleted.

In step S1909, the information management unit 1517 updates the state information of the print job, in the job management table in the device database unit 1509, which has been suspended, to "suspension".

If NO in step S1907, the flow advances to step S1910. In step S1910, the information management unit 1517 checks, on the basis of the attribute in the job packet, whether the job control command is a job resume command. If YES in step S1910, the flow advances to step S1911.

In step S1911, the information management unit 1517 performs priviledge determination for job resumption and job resume control. Priviledge determination for job resumption is performed by comparing the user name, in the job management table, which corresponds to the job number with the user name indicated by the attribute ID in the job packet subjected to job resumption processing, as in the above job cancel determination processing. Job resume control is performed by returning the job, which has been suspended by the above job suspension control, to the normal printing routine. That is, the PDL data of the print job temporarily saved in a nonvolatile storage medium such as a hard disk is simply returned to the reception buffer 1511, together with the job number. With this operation, print processing for the print job can be resumed.

In step S1912, the information management unit 1517 updates the state information 406 of the resumed print job in the job management table in the device database unit 1509 to "queued to print".

If NO in step S1910, the flow advances to step S1913. In step S1913, the information management unit 1517 checks, on the basis of the attribute in the job packet, whether the job control command is a parameter setting change command. If YES in step S1913, the flow advances to step S1914.

In step S1914, the information management unit 1517 performs confirmation of parameter setting change priviledge and parameter setting change control. Confirmation of parameter setting change priviledge is performed in the same manner as confirmation of job resumption priviledge. The information management unit 1517 changes the parameter list handle 405 in the job management table in the device database unit 1509 on the basis of the acquired parameter setting change command. The parameter list handle 405 indicates the number of copies, a color mode, and the like. By changing this value, the actual print form and the number of copies are changed.

A characteristic arrangement of the printing control apparatus of the present invention will be described.

The printing control apparatus (corresponding to the printing apparatus 110) for analyzing and printing a print job includes an input means (corresponding to the I/F driver unit 1516) for inputting a print job (FIG. 3) in which printing management data and print data are separately set, an analyzing means (corresponding to the job pre-processor unit 1510) for analyzing the printing management data, and a management information storage means (corresponding to the device database unit 1509) for storing printing management data for managing the print job on the basis of the analysis result obtained by the analyzing means. Even if the print data of the print job is not analyzed by the analyzing means, the printing management data can be stored in the management information storage means (corresponding to the description about step S713 in FIG. 7).

When analysis of a new print job is started, the analyzing means assigns job identification information to the print job, sets the job identification information in the job management table generated in the management information storage means, and stores the printing management data (corresponding to step S711 in FIG. 7).

This apparatus further includes a data conversion means (corresponding to the PDL translator unit 1512) for converting print data (corresponding to PDL data), of the above print job, which is associated with the execution of printing into intermediate data (corresponding to rendering command), intermediate data storage means (corresponding to the rendering buffer 1513) for storing the intermediate data obtained by conversion performed by the data conversion means, and rendering means (corresponding to the rendering unit 1514) for generating image data to be printed from the intermediate data stored in the intermediate data storage means, and outputting the image data to a printing unit (corresponding to the printer engine unit 1515).

The printing control apparatus also includes a printing unit including a printing means (printer engine unit 1515) for printing image data on a recording medium.

This apparatus further includes a job control means (corresponding to the information management unit 1517 or the CPU 102) for, when job control data is input through the input means, performing control corresponding to the contents of control for the print job specified by the printing management data stored in the management information storage means on the basis of the print job designated by the job control data and a control command.

The above print job includes a job packet (FIG. 16) including identification information (corresponding to the packet header 304, which is shown in detail in FIG. 16) for identifying the above printing management data and the printing management information (corresponding to the parameter information 305 of the job attribute packet) and a job packet (FIG. 16) including identification information (corresponding to the packet header 306) for identifying the print data and the print data (corresponding to the print data 307 and PDL data). The jog control data includes a job packet including identification information for identifying the control command and the control command (corresponding to the description of FIG. 19).

This apparatus further includes data attribute recognition means (corresponding to the logic channel control unit 1508) for recognizing the identification information included in the input data input through the input means, transmitting the input data recognized as a print job to the analyzing means, and transmitting the input data recognized as job control data to the job control means.

The input means is capable of two-way communication (corresponding to IEEE 1284 in this embodiment). When the input job control data requests a list of print jobs in the printing control apparatus (corresponding to "YES" in step S1901 in FIG. 19), the job control means performs control to return job information in the job management table set by the job management data of the print jobs stored in the management information storage means (corresponding to the processing in steps S1902 to S1903).

The identification information includes size information (corresponding to the parameter length in FIG. 16) indicating the data size of data following the identification information.

The analyzing means analyzes the identification data of the job packet included in the print job. If it is determined that the job packet currently being analyzed is print data, data is skipped by an amount corresponding to the size indicated by the size information included in the job packet (corresponding to the description about step S713 in FIG. 7).

If the input job control data indicates suspension of printing (corresponding to "YES" in step S1904), the job control means performs control to stop print processing for the print job specified by the job identification number included in the job control data (corresponding to the processing in step S1905).

If the input job control data indicates suspension or resumption of printing (corresponding to "YES" in step S1907), the job control means performs control to suspend or resume the print processing for the print job specified by the job identification number included in the job control data (corresponding to the processing in step S1908).

In addition, the job control means performs job control in the order of the analyzing means, the data conversion means, and the rendering means (corresponding to the description about steps S1905 and S1908).

<Effects of First Embodiment>

According to the present invention, since additional information is added to data received by the printing apparatus, and parameters and the data size of data are set in the additional information, a print job can be recognized by analyzing the additional information. In addition, the overall load volume of the print job can be detected.

Since this apparatus includes the additional information analyzing unit for analyzing additional information upon reception of data, and the storage means for holding the job information analyzed by the additional information analyzing unit, management of jobs in units of command information and execution management of data conversion and the like can be independently performed on a sequence of processing to be performed immediately after data reception or a sequence of processing following data reception.

In addition, the processing performed by the additional information analyzing unit of the present invention is much simpler and less in load than the analysis processing for output data itself, e.g., PDL data, in the prior art.

Second Embodiment

In the second embodiment of the present invention, control operation is performed to change the processing order of data added to a queue in accordance with user's intention by using the system of the first embodiment described above. This control operation will be described below.

<Assignment of Priority Levels>

When priority information set by a user with a printer driver unit 1502 of a host computer 109 is stored in a transmission buffer 1503, together with PDL data, a job packet generating unit 1507 adds the priority information indicating the priority levels of jobs to the parameter information in a job packet, and transmits the job packet to a printing apparatus 110. The printing apparatus 110 transfers the received print job to a queue 204, re-assigns a queue number 402 to the job, and processes the job in accordance with the designated priority. The priority levels are expressed by the priority information transmitted from the host computer 109 like "1, 2, 3, . . . " or "A, B, C, . . . ".

When jobs are to be ranked in the printing apparatus 110, priority levels are determined by designating print times in some case.

When a new print job is received, the received print job is temporarily registered in the lowest rank in the job management table in a device database unit 1509 by a job pre-processor unit 1510. The job pre-processor unit 1510 then rearranges the queue numbers by referring to command information indicating priority levels. When jobs with the same priority are input, the queue numbers 402 are assigned to the jobs in the input order. When the priority levels are to be determined on the basis of print times, a high priority is assigned to a job with an earlier designated print time. If the same print time is designated, a higher priority is assigned to a job that is input earlier.

Figure 9:
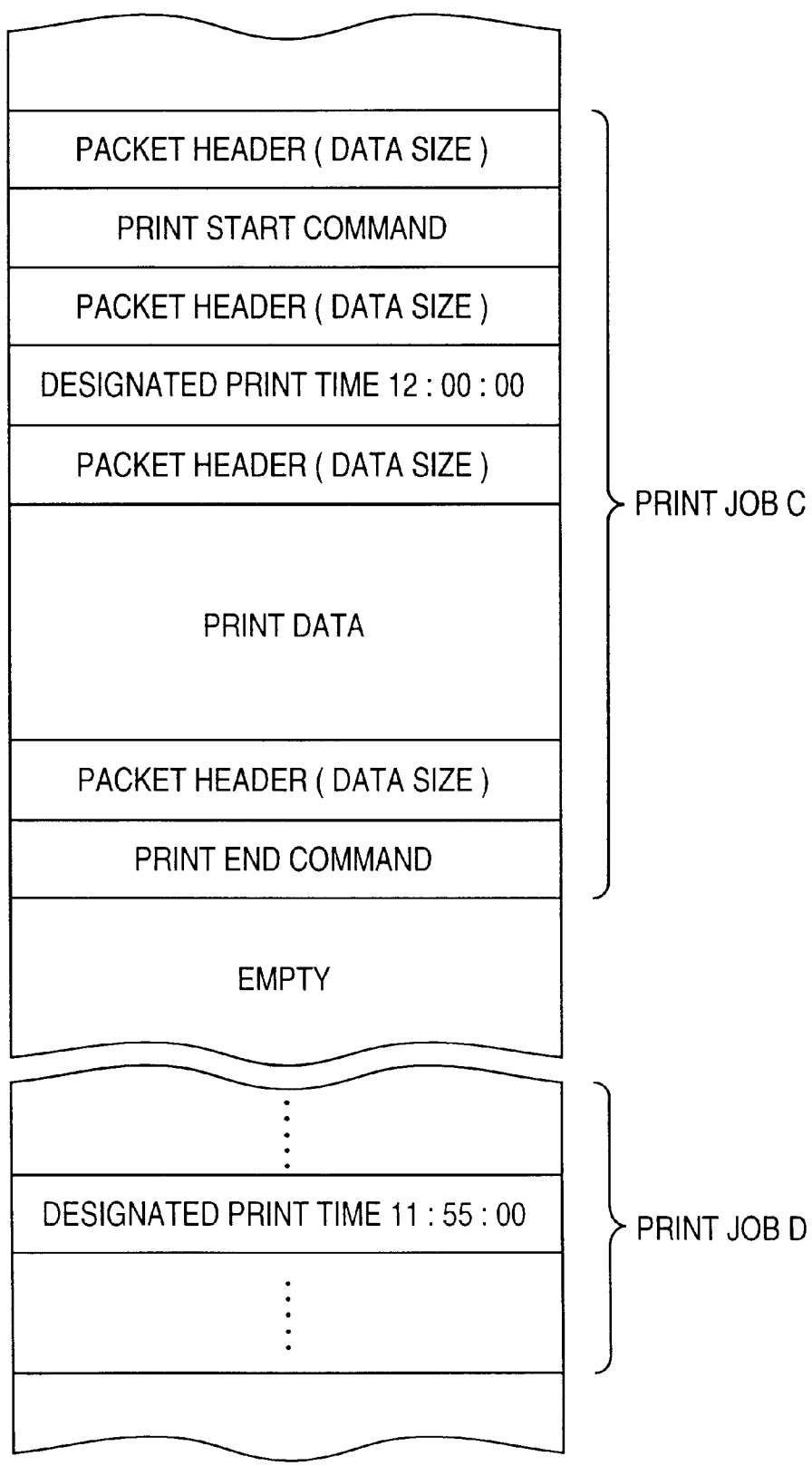
FIG. 9 is a view showing print job data in which designated print times are set.

FIG. 9 shows print job data in which print times as priority levels are set as pieces of parameter information. Time information is expressed in the form of hour (H):minute (M):second (S). In this case, the designated print time of a print job C input earlier is 12:00:00, and the designated print time of a print job input later is 11:55:00. Therefore, the priority of the print job D is higher than that of the print job C (that is, the print job D is printed first).

The respective print jobs registered in the job management table are rearranged on the basis of the priority information under the control of a central processing unit 102.

FIG. 22 shows a job management table to which priority levels are added. The same reference numerals in FIG. 22 denote the same parts as in FIG. 4. In this case, priority levels 2201 are assigned by the host computer 109. The priority levels can be changed in accordance with a job control command, as described with reference to FIG. 19 in the first embodiment. When the priority levels are changed, the queue numbers are rearranged by an information management unit 1517.

<Suspension and Resumption>

As described in the first embodiment, when the central processing unit 102 accepts a suspension command in accordance with an input from the host computer 109 or an operation unit 103, the command is sent to a print processing unit 104. The print processing unit 104 stores all the data required to resume printing in a storage unit 105.

The print processing unit 104 deletes the print job corresponding to the suspension command from the job management table. Thereafter, the priority levels in the job management table are rearranged. Print processing is performed on the basis of the priority levels of the print jobs after rearrangement.

Upon reception of a print resume command, the print processing unit 104 restores the information required to resume the suspended print job in the job management table, and resumes print processing for the print job corresponding to the suspension command.

The execution order of print jobs in suspension/resumption of a print job is changed by renumbering by deletion or interruption on the basis of the priority levels of the jobs registered in the job management table. Renumbering is performed under the control of the central processing unit 102.

<Restrictions Imposed by Host Computer/User>

As described in the first embodiment, the identification information of a host computer (client) is added to the job attribute packet of print information by using a job packet and an attribute ID, and client information is managed with the job management table in the device database unit 1509.

In the second embodiment, jobs received from a specific PC and subjected to PDL analysis are deleted, suspended, and resumed from another PC. Control for this operation will be described below.

In addition, a system capable of imposing limitations on deletion, suspension, and resumption of a job process of which is in progress, including a job that is being received or subjected to PDL analysis, on the basis of the client information managed with a job management table will be described.

In addition, user identification information is added to print information and managed with the job management table.

A system in which a job received from a specific user or a job process of which is in progress, including a job that is being subjected to PDL analysis, can be, for example, deleted, suspended, or resumed from another PC will be described.

To realize the above systems, the following mechanisms are required.

First of all, when the job packet generating unit 1507 of the host computer 109 generates a job attribute packet (step S1702 in FIG. 17), client information for specifying the device type of the host computer 109 is added to the packet as well as the user name (user information) described in the first embodiment. As client information, a computer name set in the OS is used.

When the job pre-processor unit 1510 of the printing apparatus 110 sets the parameters of a job attribute packet in the device database unit 1509, the job pre-processor unit 1510 sets the above client information as well.

A manager or the like prepares the following priviledge list in the device database unit 1509 of the printing apparatus 110 by inputting/generating the list using the operation unit of the printing apparatus (not shown). The priviledge list indicates, for example, that a user corresponding to user information "A" can cancel a print job corresponding to the user information "A", users corresponding to pieces of user information "A", "B", and "C" can perform suspension and resumption control, and users corresponding to pieces of user information "A" and "B" can change parameter settings. In addition, it suffices if client information is set in the priviledge list as well as user information. In the second embodiment, a priviledge list is set/input with the operation unit. However, the present invention is not limited to this. For example, the priviledge list set by a manager or a specific user may be externally received and stored in the device database unit 1509 in advance.

In priviledge determination in steps S1905, S1908, S1911, and S1914 in FIG. 19, the information management unit 1517 performs determination by referring to the above priviledge list, and executes job control only when a coincidence is obtained.

With such a priviledge list, the user can control jobs other than his/her own job, and can prevent unorderly job control.

In a priviledge list, pieces of user information and client information may be ranked. Assume that rank "A" is assigned to cancellation; rank "C", suspension and resumption; and rank "B", parameter setting change. In this case, a user or client placed in rank "A" can perform all job control operations, i.e., cancellation, suspension, suspension, resumption, and setting change, for all jobs. A user placed in rank "B" can perform job control operations of suspension, resumption, and setting change. A user placed in rank "C" can perform job control operations of suspension and resumption. A user placed in rank "D" cannot perform job control for jobs other than his/her own job.

By ranking the priviledges, the priviledges to job control can be assigned more elaborately.

In addition, when the host computer 109 transmits a job, a user or client who can perform job control for the job may be set in advance.

More specifically, in the printer driver unit 1502, the user sets client information or user information indicating parties permitted to perform job control, and the job packet generating unit 1507 sets the information in a job packet. In the printing apparatus 110 that receives the data, the job pre-processor unit 1510 stores client information and user information indicating parties permitted to perform job control in the device database unit 1509 in advance. In determining a priviledge to perform job control, the information management unit 1517 may check whether the client or user who has requested job control coincides with the client information or user information set in the job pre-processor unit 1510, and may perform control.

As described above, since a person who requests a job can designate a person who has a priviledge to perform job control for the job, job control can be performed in accordance with the intention of the user who has transmitted the job to be controlled. This allows execution of job control in accordance with more elaborate settings.

A characteristic arrangement of the printing control apparatus of the present invention will be described below.

In the printing control apparatus according to the first embodiment described above, the management information storage means further stores priviledge information (corresponding to a priviledge list) indicating priviledges to perform job control, and the job control means performs job control on the basis of the priviledge information.

The above priviledge information is set with the operation unit (operation unit 103) of the printing control apparatus.

In addition, the above priviledge information is input from an external unit (host computer 109) through the input means.

The above printing management data includes priority information, and the print processing order of jobs is rearranged on the basis of the priority information.

The present invention includes a storage medium in which a printing control method or printing control program based on the above mechanisms is stored.

Furthermore, the host computer includes the generating means for generating print data and the job packet generating unit for generating a print job from a job packet including printing management data and identification information for identifying the print management data and a job packet including print data and identification information for identifying the print data.

<Effects of Second Embodiment>

By adding priority information as command information to each print job, the priority information set in each print job is analyzed by the command analyzing unit, and the priority information can be managed in the job management table. Print processing is therefore performed for a print job with a high priority before a job with a low priority. The execution order of print jobs in suspension/resumption of a print job is changed by renumbering by deletion or interruption on the basis of the priority levels of the jobs registered in the job management table.

The user can therefore print an important document with a high priority without waiting for completion of the preceding print job.

In addition, limitations on clients and users who can execute job control can prevent confusion in job control and allows this printing control apparatus to perform job control in a more orderly manner.

Another Embodiment

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like). Alternatively, the present invention may be applied to a composite apparatus having a plurality of functions (copying, printing, and FAXing functions).

Figure 23:
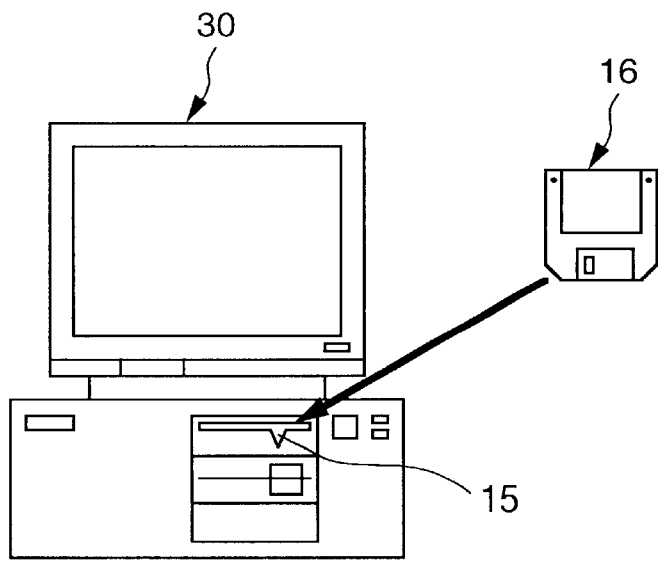
FIG. 23 is a view showing a state in which a printing control program of the present invention is supplied from a storage medium to a computer system.

As is obvious, the objects of the present invention are also achieved by supplying a storage medium, which records a program code of a software program that can realize the functions of the above-mentioned embodiments to the system or apparatus, as shown in FIG. 23, and reading out and executing the program code stored in the storage medium by a computer (or a CPU or MPU) of the system or apparatus. This program is obtained by expressing control processing in the flow charts of FIGS. 7 and 17 to 19 in this embodiment in the form of a program code.

In this case, the program code itself read out from the storage medium realizes the functions of the above-mentioned embodiments, and the storage medium which stores the program code constitutes the present invention.

Figure 24:
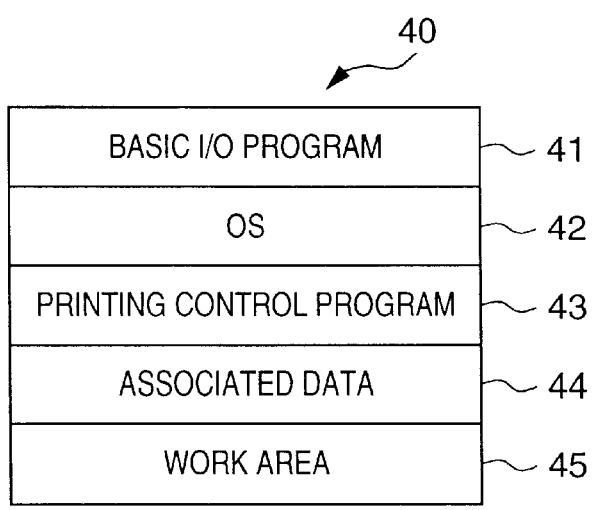
FIG. 24 is a view showing a memory map used to operate the printing control program of the present invention.

FIG. 24 shows a memory map in a state in which the control program of the present invention is loaded into the RAM included in a storage unit 105 and can be executed.

In this embodiment, this control program and the associated data are directly loaded from the storage medium into the RAM and executed. However, the control program and the associated data may be temporarily stored (installed) from an external storage medium such as an FD into a hard disk that is a nonvolatile storage medium in the storage unit 105, and may be loaded from the hard disk into the RAM when the data generation/transmission processing control program is to be operated.

As the storage medium for supplying the program code, for example, a floppy disk, hard disk, optical disk, magneto-optical disk, CD-ROM, CD-R, magnetic tape, nonvolatile memory card, ROM, and the like may be used.

Also, the functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

Figure 10:
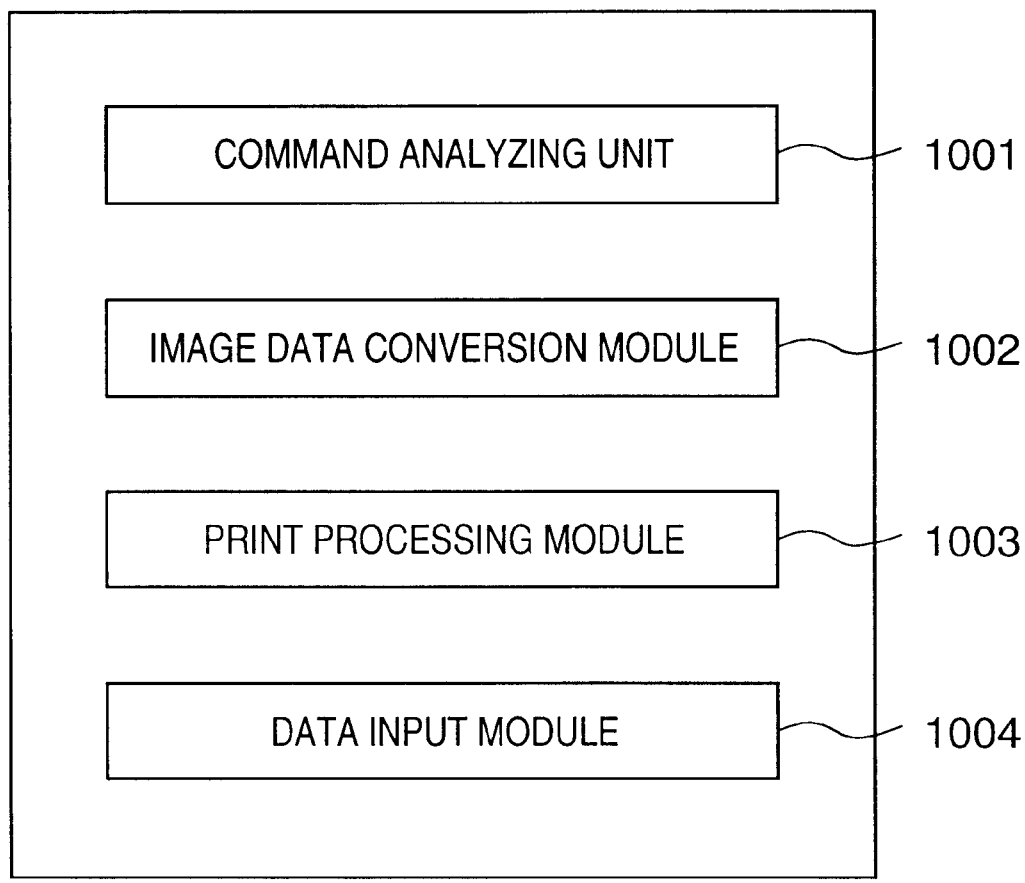
FIG. 10 is a view showing the memory map of a recording medium in this embodiment.

When the present invention is to be applied to the above storage medium, program codes corresponding to the flow charts described above are stored in the storage medium. In brief, the respective modules in the memory map shown in FIG. 10 are stored in the storage medium.

More specifically, program codes corresponding to at least a command analyzing unit 1001, an image data conversion module 1002, a print processing module 1003, and a data input module 1004 may be stored in the storage medium.

In this embodiment, the command analyzing unit 1001 functions as a command analyzing means that is the job pre-processor unit in the above embodiments. The mob management table (FIG. 4) generated by the device database unit in the storage unit 105 functions as the first data storage means. A reception buffer 202 allocated in the storage unit 105 to store print data functions as the second data storage means.

The image data conversion module 1002 functions as a data conversion means that is the PDL translator unit for converting print data into image data.

The print processing module 1003 functions as a rendering unit for executing a print job on the basis of a print control command.

The data input module 1004 functions as an input means (I/F driver unit) for receiving print job data and the like which are made up of data for managing the print job, command information for identifying the data for managing the print job, print data, command information for identifying the print data, data for designating the printing control, and command information for identifying the data for designating control.

Figure 11:
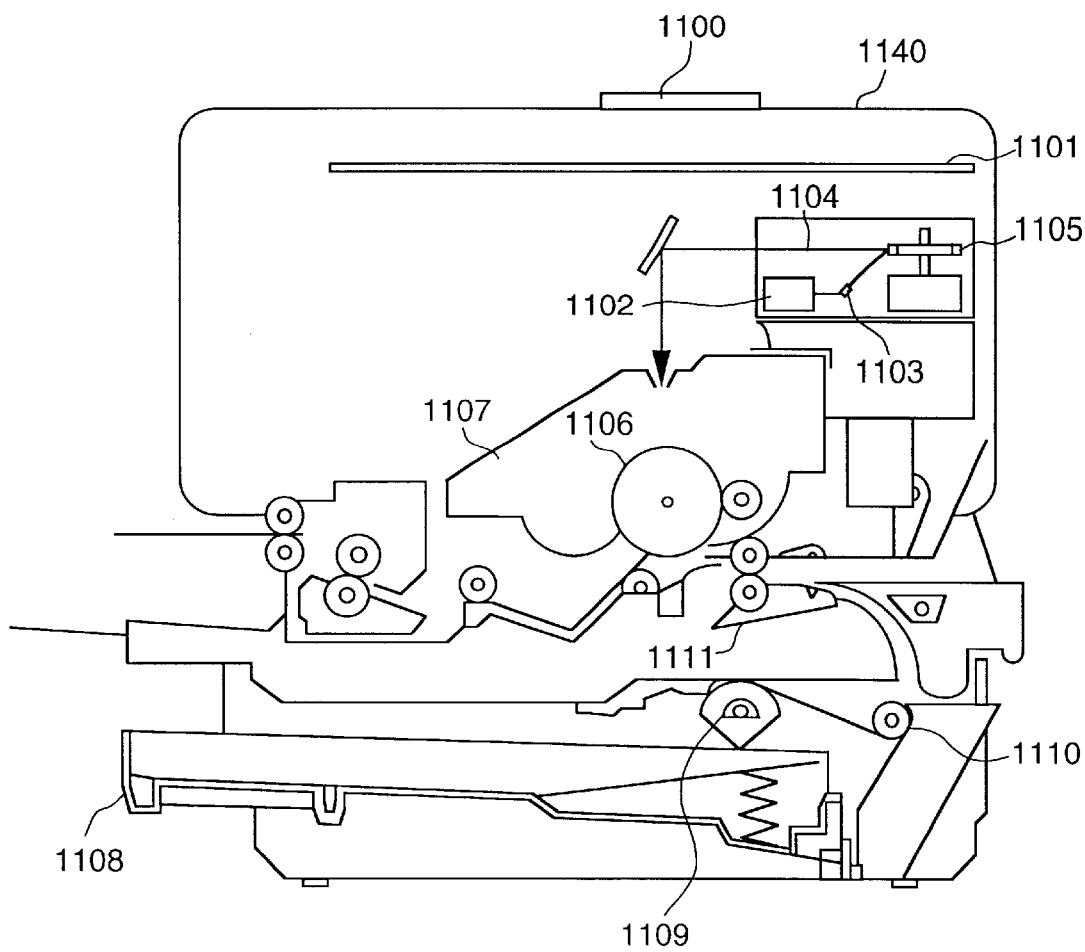
FIG. 11 is a sectional view showing the arrangement of a laser printer.
Figure 12:
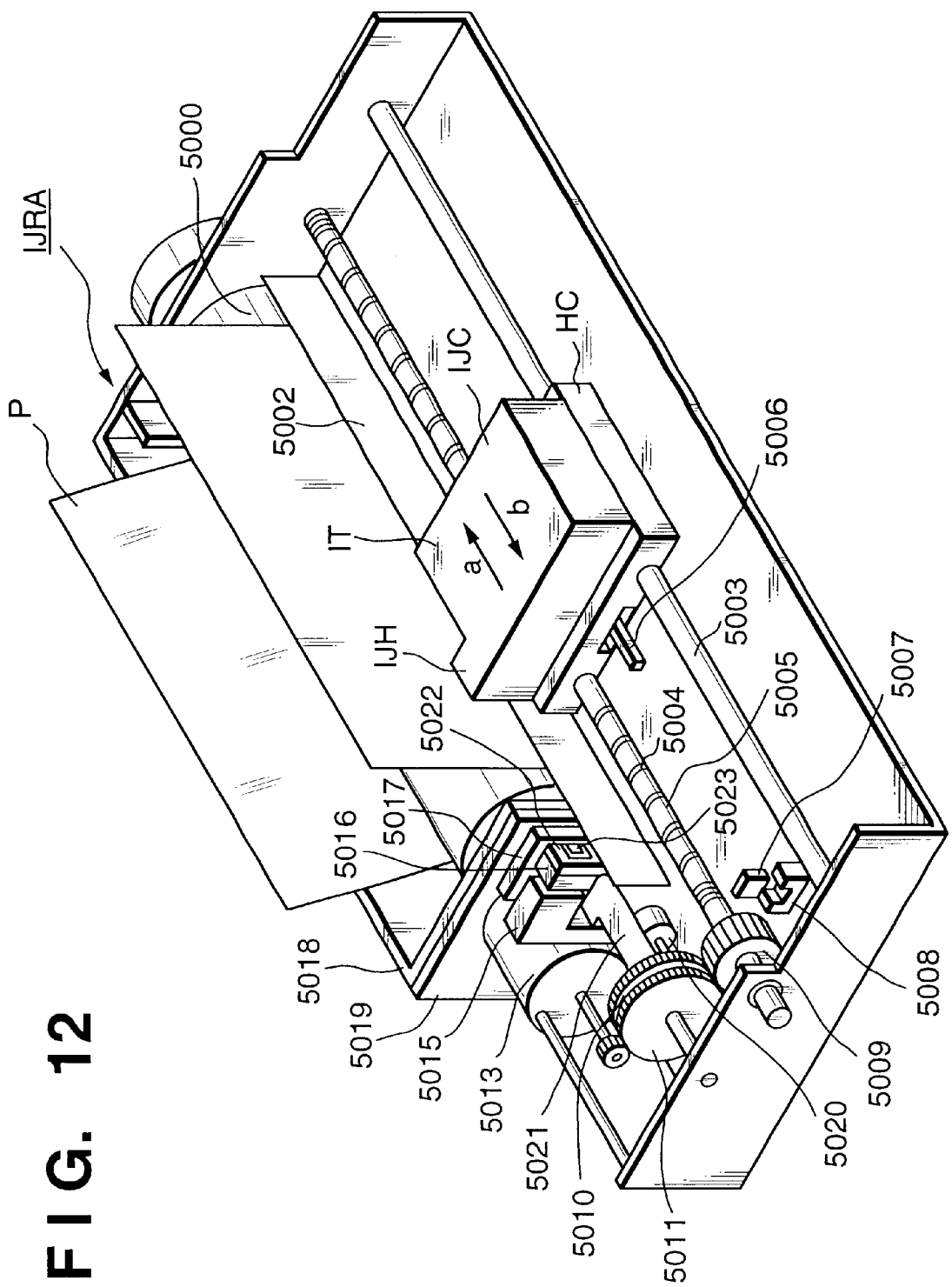
FIG. 12 is a perspective view showing an ink-jet printer.

A laser printer may be used as a printing apparatus. FIG. 11 is a sectional view showing the internal structure of a laser beam printer (to be abbreviated as an LBP hereinafter) in this case. This LBP can receive character pattern data and the like and can print them on a printing paper sheet.

Referring to FIG. 11, reference numeral 1140 denotes an LBP main body, which forms an image on a printing paper sheet as a printing medium on the basis of received character patterns and the like. Reference numeral 1100 denotes a control panel on which switches, LED display, and the like for operations are disposed; and 1101, a printer control unit for controlling the overall LBP 1140 and interpreting character pattern information and the like. The printer control unit 1101 mainly converts character pattern information into a video signal, and outputs the video signal to a laser driver 1102.

The laser driver 1102 is a circuit for driving a semiconductor laser 1103, and ON/OFF-controls a laser beam 1104 emitted by the semiconductor laser 1103 in accordance with the input video signal. The laser beam 1104 scans the surface of an electrostatic drum 1106 while being horizontally deflected by a rotary polygonal mirror 1005. Upon scanning, an electrostatic latent image of each character pattern is formed on the electrostatic drum 1006. The latent image is developed by a developing unit 1007 arranged around the electrostatic drum 1006, and the developed image is transferred onto a printing paper sheet. As the printing paper sheet, cut sheets are used. The cut sheets are stored in a paper cassette 1008 loaded into the LBP 1140 and are picked up one by one into the printer by a pickup roller 1109 and convey rollers 1110 and 1111, and the picked-up sheet is supplied to the electrostatic drum 1106.

Although the printing apparatus of this embodiment has exemplified the laser beam printer, the present invention is not limited to this and can be applied to an ink-jet printer to be described below.

Figure 14:
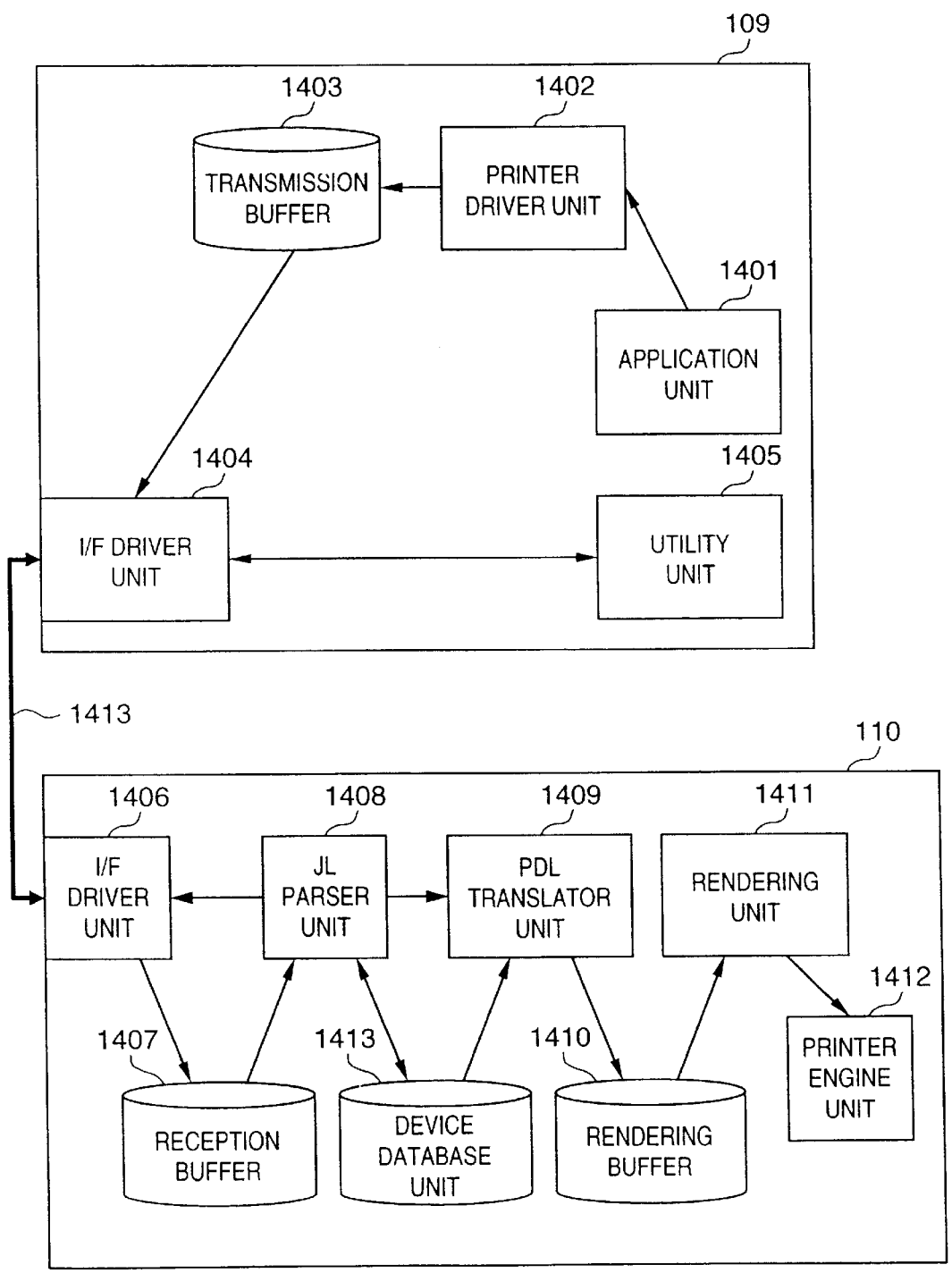
FIG. 14 is a functional block diagram showing a conventional printing control apparatus.

FIG. 11 is a perspective view of an ink-jet printing apparatus IJRA that can feed a plurality of types of paper sheets (not shown) in accordance with print jobs. Referring to FIG. 11, a carriage HC engages with a spiral groove 5004 of a lead screw 5005, which rotates via driving force transmission gears 5011 and 5009 in accordance with the forward/reverse rotation of a driving motor 5013, and is reciprocally movable in the direction of an arrow a or b via a pin (not shown). An ink-jet cartridge IJC is mounted on the carriage HC. Reference numeral 5002 denotes a paper press plate which presses a paper sheet against a platen 5000 along the carriage moving direction. Reference numerals 5007 and 5008 denote photocouplers that build a home position detection means for confirming the presence of a lever 5006 of the carriage in the region of the photocouplers and switching the rotation direction of the driving motor 5013, and the like. Reference numeral 5016 denotes a support member for supporting a cap member 5022 that caps the front surface of a print head; and 5015, a suction means for drawing the interior of the cap member by suction to attain suction recovery of the print head via an intra-cap opening 5023. Reference numeral 5017 denotes a cleaning blade; and 5019, a moving member which allows that blade to be movable in the back-and-forth direction in FIG. 14. The cleaning blade 5017 and the moving member 5019 are supported by a main body support plate 5018. The blade is not limited to the illustrated one, but a known cleaning blade may be applied to this embodiment. Reference numeral 5021 denotes a lever which is used for initiating the suction process of the suction recovery, and moves upon movement of a cam 5020 which engages with the carriage. The movement control of the lever is done by a known transmission means such as clutch switching or the like using the driving force from the driving motor. In capping, cleaning, and suction recovery described above, when the carriage enters the region on the home position side, each desired process can be performed at a corresponding position owing to the function of the lead screw 5005. If, however, each desired operation is performed at a known timing, either technique can be applied to this example.

Figure 13:
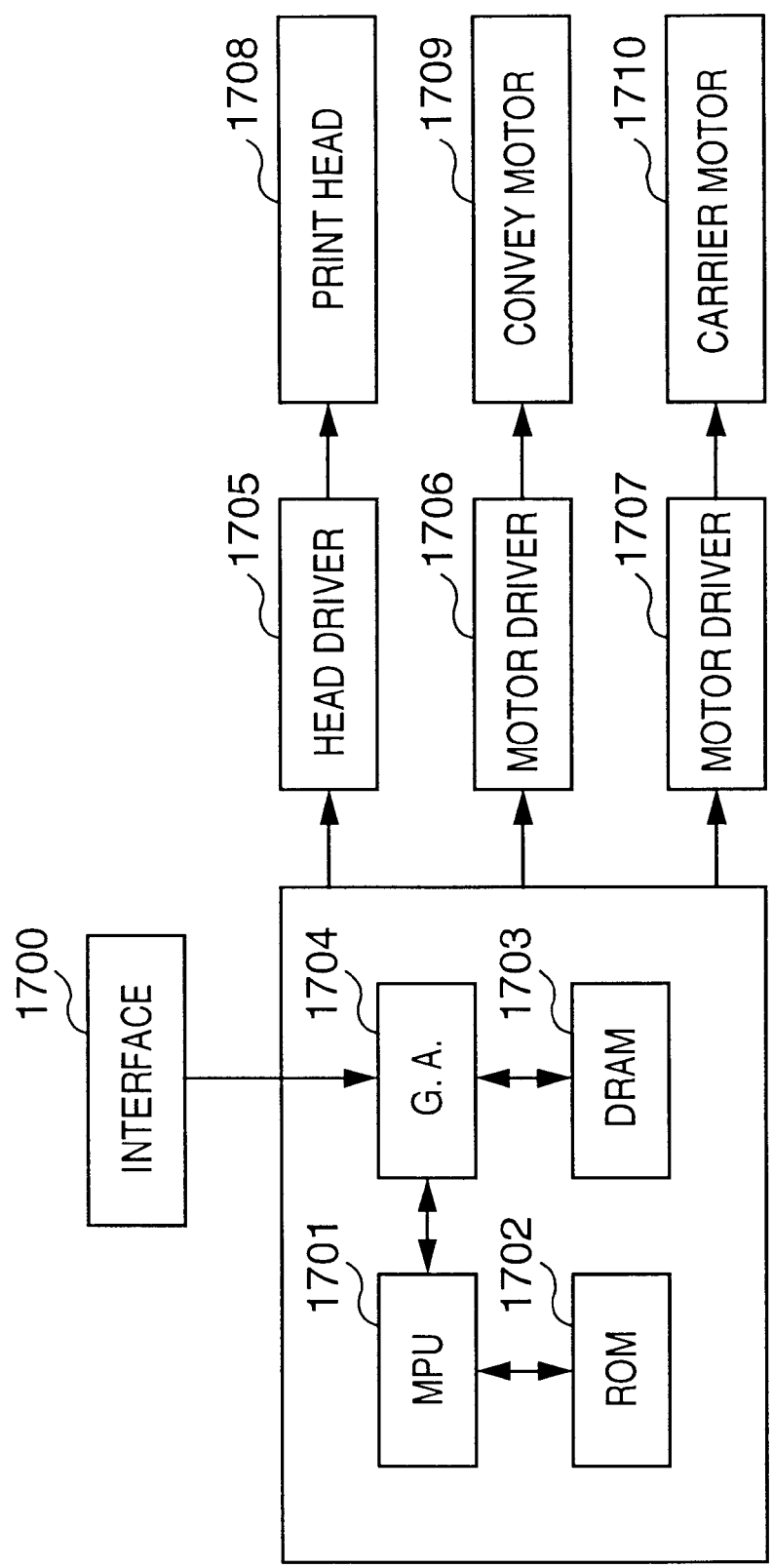
FIG. 13 is a block diagram for explaining the operation of the printer.

A control arrangement for executing printing control on the above apparatus will be described next with reference to the block diagram of FIG. 13. Referring to FIG. 13, which shows a control circuit, reference numeral 1700 denotes an interface for inputting a print signal; 1701, an MPU; 1702, a program ROM storing a control program executed by the MPU 1701; 1703, a dynamic ROM for storing various types of data (the above print signal, print data supplied to the head, and the like); 1704, a gate array for performing print data supply control on a print head 1708 and also performing data transfer control between the interface 1700, the MPU 1701, and the ROM 1703; 1710, a carrier motor for conveying the print head 1708; 1709, a convey motor for conveying a printing paper sheet; 1705, a head driver for driving the head; and 1706 and 1707, motor drivers for driving the convey motor 1709 and the carrier motor 1710.

The operation of the above control arrangement will be described. When a print signal is input to the interface 1700, the print signal is converted into print data between the gate array 1704 and the MPU 1701. The motor drivers 1706 and 1707 are then driven, and the print head 1708 is driven in accordance with the print data sent to the head driver 1705, thereby printing the data.

Evidently, the constituent elements of the present invention can be incorporated in the control arrangement for the ink-jet printer described above, and the present invention can be applied to the above ink-jet printer and the like as well as the laser beam printer.

According to the present invention, print job data are generated in units of information pairs each composed of command information and header information corresponding to the command information and serving to describe the attribute of the command information.

There are three types of command information, namely information for managing a print job, information to be printed, and information for designating printing control. Such print job data is generated by the data generating means and transmitted to the printing execution means.

The print job data received by the input means is analyzed by the command analyzing means in units of command information as part of print job data.

Data for managing a print job is stored in one storage means classified by the printing execution order, and data to be printed is converted into image data by the data conversion means and stored in another storage means. The respective data analyzed and stored in units of command information are read out in accordance with a control designation command to be subjected print processing.

Since print job data received in units of print jobs are concurrently processed in units of command information, the wait time is shortened and high-speed processing can be performed as compared with serial processing.

Print job data can be consecutively processed in units of command information without waiting for completion of overall processing for the print jobs. This facilitates management and control of jobs in a sequence of processing following the reception of print job data.

In addition, by adding the priority of each print job as command information, the priority set for each print job is analyzed by the command analyzing unit, and the priority data can be managed in a job management table. Of print jobs, therefore, a job with a high priority is subjected to print processing before a job with a low priority.

According to the present invention, in this printing control apparatus, since print data and job management information are separately set in each print job, job management information can be acquired without analyzing print job.

Furthermore, each job can be recognized without analysis of print data, and the overall load of each job can be detected. This allows management of jobs.

Moreover, since each print job in the printing control apparatus can be managed on the basis of this job management information, each print job in the printing control apparatus can be controlled in real time in accordance with a job control command received from an external apparatus.

As many apparently widely different embodiments of the present invention can be made without departing from the spirit and scope thereof, it is to be understood that the invention is not limited to the specific embodiments thereof except as defined in the claims.

What is claimed is:

1. A printing control apparatus for analyzing a print job and processing the print job, comprising:

input means for inputting data as a print job, which includes printing management data to which header information identifying the printing management data has been added, and print data to which header information identifying the print data and indicating a data size of the print data has been added, wherein the printing management data is for managing the print job;

management information storage means for storing printing management data;

print data storage means for storing print data; and preprocess means for analyzing the header information of the input data, for storing the input data as printing management data in said management information storage means when it is determined that the input data is printing management data in accordance with the header information, and for skipping process of the input data by an amount corresponding to the data size indicated by the header information to store the print data in said print data storage means, when it is determined that the input data is print data in accordance with the header information.

2. A printing control apparatus according to claim 1, wherein when analyzing a start of the print job, said preprocess means assigns job identification information to the print job, sets the job identification information in a job management table in said management information storage means, and stores the printing management data in the job management table.

3. A printing control apparatus according to claim 1, further comprising:

data conversion means for analyzing the print data stored in said print data storage means and converting the print data into intermediate data;

intermediate data storage means for storing the intermediate data obtained by said data conversion means; and rendering means for generating image data to be printed from the intermediate data stored in said intermediate data storage means, and outputting the generated image data to a printing unit.

4. A printing control apparatus according to claim 3, further comprising a printing unit including printing means for printing image data on a recording medium.

5. A printing control apparatus according to claim 1, further comprising job control means for, when a job control command is input through said input means, performing control corresponding to contents of the job control command for a print job designated by the job control command on the basis of the printing management data and the job control command.

6. A printing control apparatus according to claim 1, wherein said preprocess means skips data by an amount corresponding to the data size indicated by the header information and stores the input data in said print data storage means, when it is determined that the input data is print data in accordance with the header information.

7. A printing control apparatus according to claim 5, wherein when the job control command indicates cancellation of printing, said job control means controls to stop print processing for a print job specified by job identification information included in the job control command and deletes print data corresponding to the specified print job.

8. A method of controlling a printing control apparatus for analyzing a print job and processing the print job, said method comprising the steps of:

inputting data as a print job, which includes printing management data to which header information identifying the printing management data has been added, and print data to which header information identifying the print data and indicating a data size of the print data has been added, wherein the printing management data is for managing the print job;

storing the printing management data in management information storage means;

storing the print data in print data storage means; and analyzing the header information of the input data, storing the input data as printing management data in said management information storage step when it is determined that the input data is printing management data in accordance with the header information, and skipping process of the input data by an amount corresponding to the data size indicated by the header information to store the print data in said print data storage means, when it is determined that the input data is print data in accordance with the header information.

9. The method according to claim 8, wherein when analyzing a start of the print job, said analyzing step further comprises assigning job identification information to the print job, setting the job identification information in a job management table in the management information storage means, and storing the print management data in the job management table.

10. The method according to claim 8, further comprising the steps of:

analyzing the print data stored in said print data storage step and converting the print data into intermediate data;

storing the intermediate data obtained in said data conversion step; and generating image data to be printed from the intermediate data stored in said intermediate data storage step, and outputting the image data to a printing unit.

11. The method according to claim 10, further comprising the job control step of, when a job control command is input in said input step, performing control corresponding to contents of the job control command for a print job designated by the job control command, on the basis of the printing management data and the job control command.

12. The method according to claim 8, wherein said analyzing step further comprises skipping data by an amount corresponding to the data size indicated by the header information and storing the input data in said print data storage step, when it is determined that the input data is print data in accordance with the header information.

13. The method according to claim 11, wherein when the job control command indicates cancellation of printing, the job control step comprises controlling to stop print processing for a print job specified by job identification information included in the job control command and deleting print data corresponding to the specified print job.

14. A storage medium storing a computer-readable printing control program for controlling a printing control apparatus for analyzing a print job and processing the print job, the control program comprising program steps of:

inputting data as a print job, which includes printing management data to which header information identifying the printing management data has been added, and print data to which information identifying the print data and indicating a data size of the print data has been added, wherein the printing management data is for managing the print job;

storing the printing management data in management information storage means;

storing the print data in print data storage means; and analyzing the header information of the input data, storing the input data as printing management data in said management information storage step when it is determined that the input data is printing management data in accordance with the header information, and skipping process of the input data by an amount corresponding to the data size indicated by the header information to store the print data in said print data storage means, when it is determined that the input data is print data in accordance with the header information.

15. A printing control apparatus according to claim 1, wherein the printing management data comprise job attribute data indicating an attribute of the print job.

16. The method according to claim 8, wherein the printing management data comprise job attribute data indicating an attribute of the print job.

17. A data processing method for issuing a print job to a printing control apparatus, the method comprising the steps of:

sending to the printing control apparatus printing management data to which header information identifying the printing management data is added, wherein the printing management data is for managing the print job; and sending to the printing control apparatus print data to which header information identifying the print data and indicating a data size of the print data is added wherein the printing control apparatus receives the printing management data or the print data, analyzes the header information, stores the printing management dat in management information storage means when it is determined that the received data is the printing management data in accordance with the header information, and skips process of the received data by an amount corresponding to the data size indicated by the header information to store the print data in print data storage means when it is determined that the received data is the print data in accordance with the header information.

18. A method according to claim 17, further comprising the steps of:

acquiring the data size of the print data to be transmitted;

generating the header information from the acquired data size; and generating a packet including the header information and the print data to be transmitted, wherein the generated packet is sent to the printing control apparatus.

19. A method according to claim 17, further comprising the steps of:

comparing the data size of the print data with a maximum size of data that can be sent;

breaking up the print data into a first portion having the maximum size of data and a second portion having the remainder of the print data when the data size of the print data is larger than the maximum size of data;

generating the header information indicating the maximum size; and generating a packet including the header information and the print data corresponding to the first portion having the maximum size, wherein the generated packet is sent to the printing control apparatus.

20. A method according to claim 17, further comprising the steps of:

sending a job start packet including a print start command;

sending a plurality of transmission data packets including the header information and the print data; and sending a job end packet including a print end command.

21. A method according to claim 17, wherein the printing management data comprise job attribute data indicating an attribute of the print job.

22. A storage medium storing a computer-readable program for issuing a print job to a printing control apparatus, the program comprising program codes for:

generating a first packet including printing management data and header information identifying the printing management data; and generating a second packet including print data and header information identifying the print data and indicating a data size of the print data, wherein the generated packets are sent to the printing control apparatus wherein the printing control apparatus receives the printing management data or the print data, analyzes the header information, stores the printing management data in management information storage means when it is determined that the received data is the printing management data in accordance with the header information, and skips process of he received data by an amount corresponding to the data size indicated by the header information to store the print data in print data storage means when it is determined that the received data is the print data in accordance with the header information.

23. A storage medium according to claim 22, wherein the program further comprises program codes for:

acquiring the data size of the print data to be transmitted; and generating the header information for the print data from the acquired data size.

24. A storage medium according to claim 22, wherein the program further comprises program codes for:

comparing the data size of the print data with a maximum size of data that can be sent;

breaking up the print data into a first portion having the maximum size of data and a second portion having the remainder of the print data when the data size of the print data is larger than the maximum size of data; and generating the header information indicating the maximum size, wherein the packet including the header information and the print data corresponding to the first portion having the maximum size is generated.

25. A storage medium according to claim 22, wherein the program further comprises program codes for:

sending a job start packet including a print start command;

sending the packet including the printing management data;

sending a plurality of the packets including the print data; and sending a job end packet including a print end command.

26. A storage medium according to claim 22, wherein the printing management data comprise job attribute data indicating an attribute of the print job.

27. A computer for issuing a print job to a printing control apparatus, comprising:

a memory for storing a program;

a processor for executing the program to generate a packet including printing management data and header information identifying the printing management data and to generate a packet including print data and header information identifying the print data and indicating a data size of the print data, wherein the generated packets are sent to the printing control apparatus wherein the printing control apparatus receives the printing management data or the print data, analyzes the header information, stores the printing management data in management information storage means when it is determined that the received data is the printing management data in accordance with the header information, and skips process of the received data by an amount corresponding to the data size indicated by the header information to store the print data in print data storage means when it is determined that the received data is the print data in accordance with the header information.

* * * * *

UNITED STATES PATENT AND TRADEMARK OFFICE
CERTIFICATE OF CORRECTION

PATENT NO. : 6,600,569 B1
DATED : July 29, 2003
INVENTOR(S) : Mamoru Osada et al.

It is certified that error appears in the above-identified patent and that said Letters Patent is hereby corrected as shown below:

<u>Column 11,</u>
Line 36, "unit 15 17" should read -- unit 1517 --.

<u>Column 24,</u>
Line 8, "suspension," (first occurrence) should be deleted.

<u>Column 26,</u>
Line 18, "202allocated" should read -- 202 allocated --.

<u>Column 31,</u>
Line 26, "dat" should read -- data --.

Signed and Sealed this

Twentieth Day of January, 2004

JON W. DUDAS
*Acting Director of the United States Patent and Trademark Office*